United States Patent
Kim

(10) Patent No.: US 10,075,547 B2
(45) Date of Patent: *Sep. 11, 2018

(54) PROXY DEVICE FOR REDUCING NUMBER OF CONNECTIONS TO GATEWAY

(71) Applicant: Belkin International Inc., Playa Vista, CA (US)

(72) Inventor: Ryan Yong Kim, Rolling Hills Estates, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/507,516

(22) Filed: Oct. 6, 2014

(65) Prior Publication Data

US 2016/0100022 A1    Apr. 7, 2016

(51) Int. Cl.
*H04L 29/08* (2006.01)
*H04W 12/04* (2009.01)
(Continued)

(52) U.S. Cl.
CPC ............ *H04L 67/28* (2013.01); *H04L 67/141* (2013.01); *H04W 12/04* (2013.01); *H04W 4/02* (2013.01);
(Continued)

(58) Field of Classification Search
CPC ...... H04L 67/28; H04L 67/141; H04W 12/04; H04W 4/70; H04W 4/02; H04W 4/027; H04W 88/16
See application file for complete search history.

(56) References Cited

U.S. PATENT DOCUMENTS 4,956,875 A * 9/1990 Bernard ............... G08B 27/008
340/7.5
8,893,209 B2 * 11/2014 Albano ............... H04L 12/2801
725/120

(Continued)

FOREIGN PATENT DOCUMENTS

CN    203084787    7/2013
CN    102595608    11/2014

OTHER PUBLICATIONS

U.S. Appl. No. 14/507,587, "Final Office Action", dated Aug. 18, 2017, 10 pages.
(Continued)

*Primary Examiner* — Uzma Alam
(74) *Attorney, Agent, or Firm* — Kilpatrick Townsend & Stockton LLP

(57) ABSTRACT

Techniques and systems for operating a device as a communication proxy for other devices are provided. For example, a method, computing device, or computer-program product may be provided, and may include receiving a device communication using a connection with a first device, determining that the device communication is from the first device, wherein the computing device and the first device are able to connect with a second device, and establishing a connection with the second device, wherein the computing device operates as a communication proxy for the first device by using the connection with the second device to exchange communications with the second device for the first device, and wherein the computing device and the first device include Internet of Things devices and share a common cloud network service provider. The method, computing device, or computer-program product may further include transmitting the device communication using the connection with the second device.

24 Claims, 17 Drawing Sheets

(51) Int. Cl.
  *H04W 4/70* (2018.01)
  *H04W 88/16* (2009.01)
  *H04W 4/02* (2018.01)

(52) U.S. Cl.
  CPC .............. *H04W 4/027* (2013.01); *H04W 4/70* (2018.02); *H04W 88/16* (2013.01)

(56) References Cited

U.S. PATENT DOCUMENTS

| | | | |
|---|---|---|---|
| 9,154,976 B1* | 10/2015 | Martin | H04L 41/12 |
| 9,338,085 B2* | 5/2016 | Chiang | H04L 45/24 |
| 9,497,196 B2 | 11/2016 | Kim et al. | |
| 9,553,876 B2 | 1/2017 | Kim et al. | |
| 9,742,664 B2* | 8/2017 | Carson | H04L 45/245 |
| 2003/0063589 A1* | 4/2003 | Haines | H04W 64/00 |
| | | | 370/338 |
| 2006/0077926 A1 | 4/2006 | Rune | |
| 2007/0016688 A1* | 1/2007 | Hester | H04L 12/66 |
| | | | 709/238 |
| 2007/0104168 A1* | 5/2007 | Polson | H04W 28/08 |
| | | | 370/338 |
| 2007/0263587 A1 | 11/2007 | Savoor et al. | |
| 2009/0109898 A1* | 4/2009 | Adams | H04W 48/18 |
| | | | 370/328 |
| 2010/0220595 A1* | 9/2010 | Petersen | H04L 12/4633 |
| | | | 370/235 |
| 2011/0007646 A1* | 1/2011 | Miller | H04B 7/18513 |
| | | | 370/252 |
| 2011/0028179 A1 | 2/2011 | Sawai et al. | |
| 2011/0103392 A1* | 5/2011 | Fan | H04L 41/0668 |
| | | | 370/401 |
| 2011/0299422 A1* | 12/2011 | Kim | H04W 48/16 |
| | | | 370/253 |
| 2011/0320577 A1 | 12/2011 | Bhat et al. | |
| 2012/0213098 A1 | 8/2012 | Sun et al. | |
| 2013/0324143 A1* | 12/2013 | Yokomakura | H04L 5/0005 |
| | | | 455/452.1 |
| 2014/0068079 A1 | 3/2014 | Kumar et al. | |
| 2014/0126543 A1 | 5/2014 | Yao et al. | |
| 2014/0169015 A1 | 6/2014 | Chan et al. | |
| 2014/0266778 A1 | 9/2014 | Cameron et al. | |
| 2014/0359131 A1* | 12/2014 | Seed | H04W 4/70 |
| | | | 709/226 |
| 2015/0063368 A1* | 3/2015 | Sharma | H04L 47/18 |
| | | | 370/412 |
| 2015/0120863 A1 | 4/2015 | Wu et al. | |
| 2015/0134954 A1* | 5/2015 | Walley | H04L 63/08 |
| | | | 713/168 |
| 2015/0222711 A1* | 8/2015 | Huo | H04L 67/141 |
| | | | 709/228 |
| 2015/0312363 A1* | 10/2015 | Robinson | H04L 67/2814 |
| | | | 709/219 |
| 2015/0381737 A1* | 12/2015 | Quinn | H04L 67/12 |
| | | | 709/217 |
| 2015/0381776 A1* | 12/2015 | Seed | H04W 4/70 |
| | | | 709/203 |
| 2016/0006815 A1* | 1/2016 | Dong | G06F 9/46 |
| | | | 709/204 |
| 2016/0007288 A1* | 1/2016 | Samardzija | H04W 52/0229 |
| | | | 370/311 |
| 2016/0029248 A1 | 1/2016 | Syed et al. | |
| 2016/0049823 A1* | 2/2016 | Stein | H02J 7/025 |
| | | | 320/108 |
| 2016/0100023 A1 | 4/2016 | Kim | |
| 2016/0353227 A1 | 12/2016 | Sachs et al. | |
| 2017/0195866 A1 | 7/2017 | Kim | |

OTHER PUBLICATIONS

U.S. Appl. No. 14/507,587, "First Action Interview Office Action Summary", dated Apr. 20, 2017, 7 pages.
U.S. Appl. No. 14/507,587, "First Action Interview Pilot Program Pre-Interview Communication", dated Jan. 12, 2017, 5 pages.

\* cited by examiner

700

```
┌─────────────────────────────────────────┐
│ RECEIVE A DEVICE COMMUNICATION, WHEREIN THE │
│ DEVICE COMMUNICATION IS RECEIVED USING A │
│ CONNECTION WITH A FIRST DEVICE, AND WHEREIN THE │
│ CONNECTION WITH THE FIRST DEVICE IS ESTABLISHED │
│ OVER A FIRST CHANNEL OF A FREQUENCY BAND │
│                  702                     │
└─────────────────────────────────────────┘
                    │
                    ▼
┌─────────────────────────────────────────┐
│ DETERMINE THAT THE DEVICE COMMUNICATION IS FROM │
│ THE FIRST DEVICE, WHEREIN THE COMPUTING DEVICE │
│ AND THE FIRST DEVICE ARE ABLE TO CONNECT WITH A │
│              SECOND DEVICE               │
│                  704                     │
└─────────────────────────────────────────┘
                    │
                    ▼
┌─────────────────────────────────────────┐
│ ESTABLISH A CONNECTION WITH THE SECOND DEVICE, │
│ WHEREIN THE CONNECTION WITH THE SECOND DEVICE IS │
│    ESTABLISHED OVER A SECOND CHANNEL OF THE │
│   FREQUENCY BAND, WHEREIN THE COMPUTING DEVICE │
│  OPERATES AS A COMMUNICATION PROXY FOR THE FIRST │
│   DEVICE BY USING THE CONNECTION WITH THE SECOND │
│    DEVICE TO EXCHANGE COMMUNICATIONS WITH THE │
│   SECOND DEVICE FOR THE FIRST DEVICE, AND WHEREIN │
│  THE COMPUTING DEVICE AND THE FIRST DEVICE INCLUDE │
│   INTERNET OF THINGS DEVICES AND SHARE A COMMON │
│          CLOUD NETWORK SERVICE PROVIDER  │
│                  706                     │
└─────────────────────────────────────────┘
                    │
                    ▼
┌─────────────────────────────────────────┐
│ TRANSMIT THE DEVICE COMMUNICATION, WHEREIN THE │
│  DEVICE COMMUNICATION IS TRANSMITTED OVER THE │
│ SECOND CHANNEL OF THE FREQUENCY BAND USING THE │
│      CONNECTION WITH THE SECOND DEVICE    │
│                  708                     │
└─────────────────────────────────────────┘
```

FIG. 7

PROXY DEVICE FOR REDUCING NUMBER OF CONNECTIONS TO GATEWAY

FIELD

The present disclosure relates to optimizing network performance. Specifically, various techniques and systems are provided for operating a device as a communication proxy for other devices to reduce the number of connections to a gateway.

BACKGROUND

One or more gateways may be present within a local area network. For example, a local area network may include a router and may also include one or more range extending devices. Client devices (e.g., network devices, access devices, or the like) that provide various functionalities may also be present within the local area network. A gateway allows client devices to access a network by providing wired connections and/or wireless connections using radio frequency channels in one or more frequency bands. Client devices connect to the gateway using one or more channels of a frequency band. The quality of communications that a client device can achieve with other devices on the network may be adversely affected by various factors. For example, throughput, latency, and other network characteristics may be affected as more and more client devices connect with the gateway providing access to the network.

BRIEF SUMMARY

Techniques and systems are described for operating a device as a communication proxy for other devices. In some examples, a device may operate as a communication proxy for one or more devices by exchanging communications with other devices (e.g., a gateway or other device) for the one or more devices. A device acting as a proxy may be referred to herein as a proxy device. The proxy device may transmit and receive communications to and from the other devices for the one or more devices. The device and the other devices may include Internet of Things (IoT) devices, such as home automation devices, appliance devices with communication capabilities, lighting devices with communication capabilities, or any other IoT device. For example, the devices may include network devices that can communicate, access, and/or control other network devices over one or more communication connections or channels. In addition to the communication and control capabilities of the devices, the devices can also act as communication proxies for other devices. The devices may act as communication proxies for other devices that share a common cloud network service provider and/or a common proprietary program. For example, the devices may share a common Internet of Things (IoT) cloud network service provider and/or proprietary program. As another example, devices may share a common voice-over-Internet-Protocol (VoIP) cloud network service provider and/or proprietary program. One of ordinary skill in the art will appreciate that the techniques described herein are not limited to any particular network service provider, and thus apply to any network service provider that provides network services to a common group of devices. In some embodiments, the devices may be manufactured and/or sold by a common manufacturer that also owns or operates the common cloud network service provider and the common proprietary program. Accordingly, the devices may operate as communication proxies for other devices that are manufactured by a common manufacturer and that share a common cloud network service provider.

By operating a device as a proxy for other devices, the number of connections to a receiving device, such as a gateway or other device, is reduced by the number of devices that use the proxy device to communicate. Reducing the number of connections reduces communication latency and also allows the full bandwidth capability of each connection to be utilized for exchanging communications.

In some examples, the proxy device may be any device that can connect with another device. For example, the proxy device may include a client device, such as a network device or an access device. The proxy device may be selected among the devices to operate as a proxy based on various factors. For example, a device that has the strongest connection with or is receiving the strongest signal from the gateway or other device may be chosen as the proxy. As another example, a device may be selected as a proxy device based on its communications capabilities, such as having more than one transceiver radio, higher processing power than other devices, or the like. Other examples of factors that may be taken into account when selecting a proxy device are discussed in further detail below. Other devices that are within a range of signals transmitted by the gateway or other device and that are able to access the network provided by the gateway or other device may connect with the proxy device instead of the gateway or other device. In some embodiments, one or more of these devices may connect with the proxy device using one or more mesh network protocols. The proxy device may receive communications from one or more of the devices, and may send the communications to the gateway or other device over the connection that has been established between the proxy device and the gateway or other device. In embodiments in which the proxy device communicates with a gateway for other devices, the gateway may be connected to one or more wide area networks (e.g., the Internet, a cloud network, and/or the like), and may direct the communications to an appropriate network or other destination. The proxy device may also receive communications, from the gateway or other device, that are destined for one or more of the devices for which the proxy device is operating as a proxy. The proxy device may determine the device to which the communication is destined, and may send the communications to the destination device. In some embodiments, a proxy device may include a single transceiver radio for each frequency band for which the proxy device is configured to communicate. In some embodiments, a proxy device may include multiple transceiver radios for each frequency band.

According to at least one example, a computing device may be provided that includes one or more data processors, and a receiver configured to receive a device communication, wherein the device communication is received using a connection with a first device. The computing device further includes a non-transitory machine-readable storage medium containing instructions, which when executed on the one or more data processors, cause the one or more processors to perform operations including determining that the device communication is from the first device, wherein the computing device and the first device are able to connect with a second device, and establishing a connection with the second device, wherein the computing device operates as a communication proxy for the first device by using the connection with the second device to exchange communications with the second device for the first device, and wherein the computing device and the first device include Internet of Things devices and share a common cloud network service provider. The computing device further includes a transmitter configured to transmit the device communication, wherein the device communication is transmitted using the connection with the second device.

In some embodiments, a computer-implemented method may be provided that includes receiving, on a computing device, a device communication, wherein the device communication is received using a connection with a first device. The method further includes determining that the device communication is from the first device, wherein the computing device and the first device are able to connect with a second device. The method further includes establishing a connection with the second device, wherein the computing device operates as a communication proxy for the first device by using the connection with the second device to exchange communications with the second device for the first device, wherein the computing device and the first device include Internet of Things devices and share a common cloud network service provider. The method further includes transmitting the device communication, wherein the device communication is transmitted using the connection with the second device.

In some embodiments, a computer-program product tangibly embodied in a non-transitory machine-readable storage medium of a computing device may be provided. The computer-program product may include instructions configured to cause one or more data processors to: receive a device communication, wherein the device communication is received using a connection with a first device; determine that the device communication is from the first device, wherein the computing device and the first device are able to connect with a second device; establish a connection with the second device, wherein the computing device operates as a communication proxy for the first device by using the connection with the second device to exchange communications with the second device for the first device, wherein the computing device and the first device include Internet of Things devices and share a common cloud network service provider; and transmit the device communication, wherein the device communication is transmitted using the connection with the second device.

In some embodiments, the method, computing device, and computer-program product described above may further include wherein the computing device operates as a communication proxy for a device when the device is able to connect with the second device. In some embodiments, the second device includes a gateway. In some embodiments, the second device includes an Internet of Things device.

In some embodiments, a single transceiver radio includes the receiver and the transmitter. In some embodiments, a first transceiver radio includes the receiver, and a second transceiver radio includes the transmitter.

In some embodiments, the computing device operates as a communication proxy for all devices located in a common geographic location.

In some embodiments, the method, computing device, and computer-program product described above may further include: wherein the receiver is configured to receive a second device communication using the connection with the second device; instructions, which when executed on the one or more data processors, cause the one or more processors to determine that the second device communication is intended for reception by the first device; and wherein the transmitter is configured to transmit the second device communication, wherein the second device communication is transmitted using the connection with the first device.

In some embodiments, the computing device is selected as the communication proxy for the first device based on an ability of the receiver to receive signals from the second device that are stronger than signals that a receiver of the first device can receive. The computing device may be selected as the communication proxy based on various other factors and/or metrics, as described herein.

According to at least one example, a computing device may be provided that includes one or more data processors, and a first transceiver radio configured to receive a device communication, wherein the device communication is received using a connection with a first device, and wherein the connection with the first device is established over a first channel of a frequency band. The computing device further includes a non-transitory machine-readable storage medium containing instructions, which when executed on the one or more data processors, cause the one or more processors to perform operations including determining that the device communication is from the first device, wherein the computing device and the device are able to connect with a second device, and establishing a connection with the second device, wherein the connection with the second device is established over a second channel of the frequency band, wherein the computing device operates as a communication proxy for the first device by using the connection with the second device to exchange communications with the second device for the first device, and wherein the computing device and the first device include Internet of Things devices and share a common cloud network service provider. The computing device further includes a second transceiver radio configured to transmit the device communication, wherein the device communication is transmitted over the second channel of the frequency band using the connection with the second device.

In some embodiments, a computer-implemented method may be provided that includes receiving, on a computing device, a device communication using a first transceiver radio, wherein the device communication is received using a connection with a first device, and wherein the connection with the first device is established over a first channel of a frequency band. The method further includes determining that the device communication is from the first device, wherein the computing device and the first device are able to connect with a second device. The method further includes establishing a connection with the second device, wherein the connection with the second device is established over a second channel of the frequency band, wherein the computing device operates as a communication proxy for the first device by using the connection with the second device to exchange communications with the second device for the first device, and wherein the computing device and the first device include Internet of Things devices and share a common cloud network service provider. The method further includes transmitting the device communication using a second transceiver radio, wherein the device communication is transmitted over the second channel of the frequency band using the connection with the second device.

In some embodiments, a computer-program product tangibly embodied in a non-transitory machine-readable storage medium of a computing device may be provided. The computer-program product may include instructions configured to cause one or more data processors to: receive a device communication using a first transceiver radio, wherein the device communication is received using a connection with a first device, and wherein the connection with the first device is established over a first channel of a frequency band; determine that the device communication is from the first device, wherein the computing device and the first device are able to connect with a second device; establish a connection with the second device, wherein the connection with the second device is established over a second channel of the frequency band, wherein the computing device operates as a communication proxy for the first device by using the connection with the second device to exchange communications with the second device for the first device, and wherein the computing device and the first device include Internet of Things devices and share a common cloud network service provider; and transmit the device communication using a second transceiver radio, wherein the device communication is transmitted over the second channel of the frequency band using the connection with the second device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 is a flowchart illustrating another embodiment of a process of operating a computing device as a communication proxy for a device, in accordance with some embodiments.

DETAILED DESCRIPTION

Figure 1:
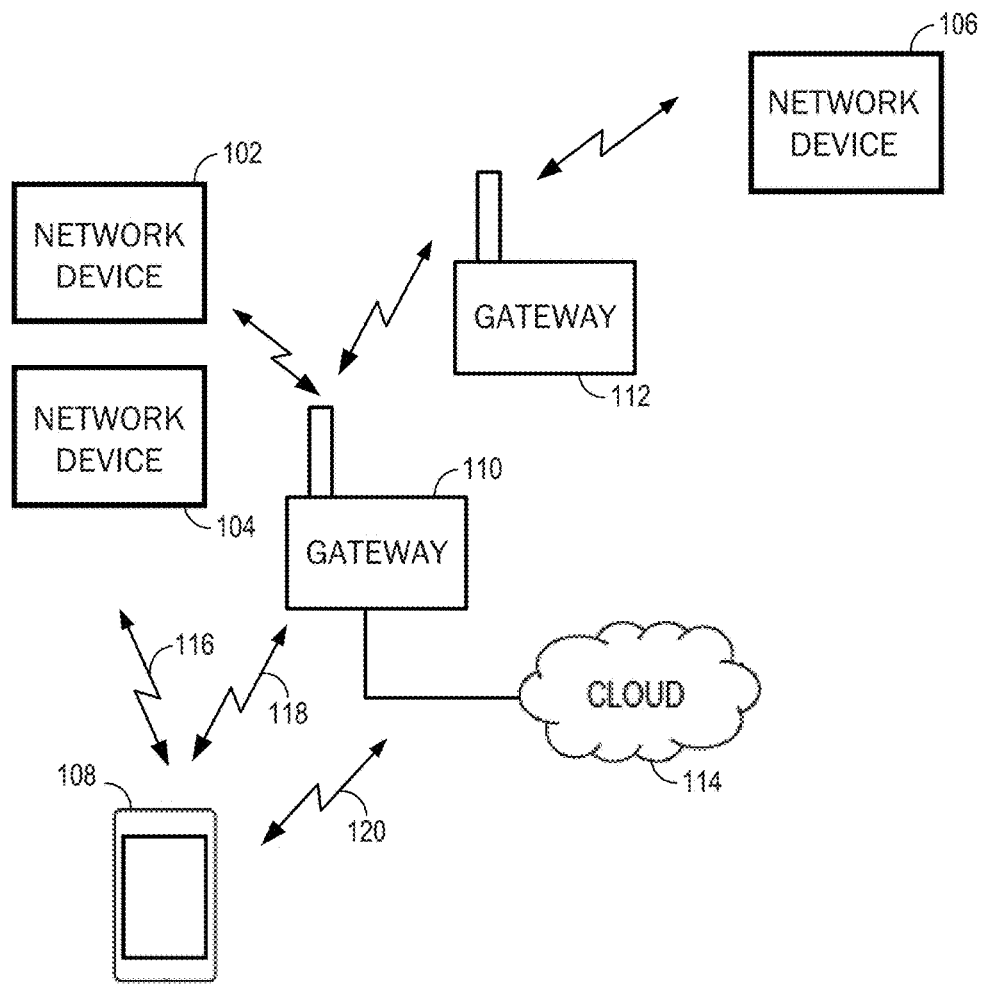
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment or a venue can include, for example, a home, an office, a business, an automobile, a park, an industrial or commercial plant, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network of a venue can include multiple network devices that provide various functionalities. Network devices may be accessed and controlled using an access device and/or one or more network gateways. One or more gateways in the local area network may be designated as a primary gateway that provides the local area network with access to an external network. In the event the venue includes a structure or building, the local area network can extend outside of the venue, and may include network devices located outside of the venue. For instance, the local area network can include network devices such as exterior motion sensors, exterior lighting (e.g., porch lights, walkway lights, security lights, or the like), garage door openers, sprinkler systems, or other network devices that are exterior to the venue. A user may be able to access the network devices while located within the local area network and also while located remotely from the local area network. For example, a user may access the network devices using an access device within the local area network or remotely from the local area network.

A network device within the local area network may pair with or connect to a gateway, and may obtain credentials from the gateway. For example, when the network device is powered on, a list of gateways that are detected by the network device may be displayed on a user's access device (e.g., via an application, program, or the like installed on and executed by the access device). In some embodiments, only a single gateway is included in the local area network (e.g., any other displayed gateways may be part of other local area networks). In such embodiments, only the single gateway may be displayed (e.g., when only the single gateway is detected by the network device). In some embodiments, multiple gateways may be located in the local area network (e.g., a router, a range extending device, or the like), and may be displayed. A user may select a gateway as the gateway with which the network device is to pair, and may enter login information for accessing the gateway. The login information may be the same information that was originally set up for accessing the gateway (e.g., a network user name and password, a network security key, or any other appropriate login information). The access device may send the login information to the network device, and the network device may use the login information to pair with the gateway. The network device may then obtain the credentials from the gateway. The credentials may include a service set identification (SSID) of the local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The server may register the gateway as a logical network, and may assign the first logical network a network identifier (ID). The server may further generate a set of security keys, which may include one or more security keys. For example, the server may generate a unique key for the network device and a separate unique key for the access device. The server may associate the network device and the access device with the logical network by storing the network ID and the set of security keys in a record or profile. The server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Further details relating to an accountless authentication process are described below. Also, the network device can communicate with the server regarding the logical network.

FIG. 1 illustrates an example of a local area network 100. It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

As illustrated in FIG. 1, the local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include automation network devices that allow a user to access, control, and/or configure various appliances, devices, or tools located within an environment or venue (e.g., a television, radio, light, fan, humidifier, sensor, microwave, iron, a tool, a manufacturing device, a printer, a computer, and/or the like), or outside of the venue (e.g., exterior motion sensors, exterior lighting, garage door openers, sprinkler systems, or the like). For example, network device 102 may include a home automation switch that may be coupled with a home appliance. In some embodiments, network devices such as an automation network device may be used in other environments or venues, such as a business, a school, an establishment, a park, an industrial or commercial plant, or any place that can support the local area network 100 to enable communication with network devices. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled appliance such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

Upon being powered on or reset, network devices may be registered with an external network (e.g., cloud network 114) and associated with a logical network within the local area network 100. Details relating to registration of network devices are described below with respect to FIG. 8.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™, Zigbee™, Bluetooth™, infrared (IR), cellular, Long-Term Evolution (LTE), WiMax™, or other wireless communication technologies, or any combination thereof. For example, the WiFi™ protocol is described in the IEEE 802.11 family of standards. Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

The network devices 102, 104, 106 and access device 108 can transmit and receive signals using one or more channels of various frequency bands provided by the gateways 110 and/or 112. One of ordinary skill in the art will appreciate that any available frequency band, including those that are currently in use or that may become available at a future date, may be used to transmit and receive communications according to embodiments described herein. In some examples, the network devices 102, 104, 106, the access device 108, and the gateways 110, 112 may exchange communications using channels of different WiFi™ frequency bands. For example, different channels available on a 2.4 gigahertz (GHz) WiFi™ frequency band that spans from 2.412 GHz to 2.484 GHz may be used. As another example, different channels available on a 5 GHz WiFi frequency band that spans from 4.915 GHz to 5.825 GHz may be used. Other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), or the like. Yet other examples of frequency bands that may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz).

Some or all of the channels may be available for use in a network. For example, channels 1-11 of the 2.4 GHz frequency may be available for use in a local area network. As another example, channels 36, 40, 44, 48, 52, 56, 60, 64, 100, 104, 108, 112, 116, 132, 136, 140, 149, 153, 157, 161, and 161 of the 5 GHz frequency band may be available for use in a local area network. One of ordinary skill in the art will appreciate that any combination of the channels available on any of the frequency bands may be available for use in a network. The channels that are available for use may be regulated by the country in which the network is located.

Figure 2:
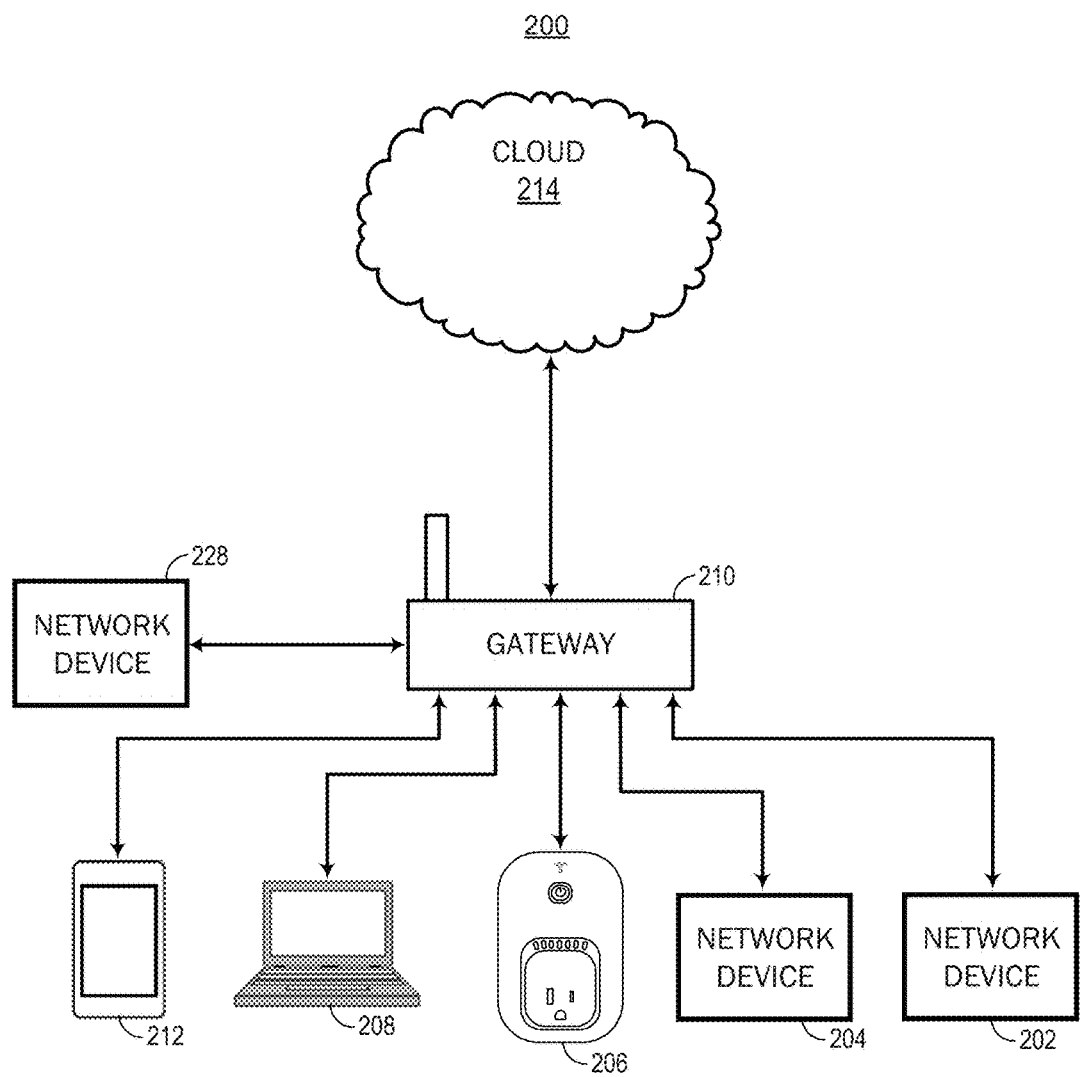
FIG. 2 is an illustration of another example of a network environment, in accordance with some embodiments.

FIG. 2 illustrates an example of a network 200. Similar to the local area network 100 described above, the network 200 includes network devices 202, 204, 206, 228, access devices 208, 212, gateway 210, and an external network 214. The gateway 210, the network devices 202, 204, 206, 228, the access devices 208, 212, and the external network 214 may be similar and have the same functionalities and capabilities as the gateway 110 or 112, the network devices 102, 104, or 106, the access device 108, and the external network 114 described above with respect to FIG. 1. It should be appreciated that the network 200 may have other components than those depicted. Further, the embodiment shown in the figure is only one example of a network that may incorporate an embodiment of the invention. In some other embodiments, network 200 may have more or fewer components than shown in the figure, may combine two or more components, or may have a different configuration or arrangement of components. For example, while a certain number of network devices, access devices, and gateways are shown in FIG. 2, one of ordinary skill in the art will appreciate that any number of network devices, access devices, and gateways may be included in the network 200.

The network devices 202, 204, 206, 228 may include IoT devices that share a common cloud network service provider and/or proprietary program. For example, the network devices 202, 204, 206, 228 are able to communicate with one another and may be configured to access and/or control one another, as well as other network devices, over one or more communication connections or channels. In one example, the network device 206 may include an automation switch that allows a user to remotely configure and control any electronic device that can be plugged into the network device 206. The network device 206 may be in communication with the other network devices 202, 204, 228. For example, the network device 202 may include a thermostat device. The automation switch network device 206 may communicate to the thermostat network device 202 that a light has been turned on using the network device 206. The thermostat network device 202 may control a heating, ventilating, and air conditioning system to heat or cool a venue to a certain temperature in response to receiving the communication that the light has been turned on. The network devices 202, 204, 206, 228 may share a proprietary program that allows the devices 202, 204, 206, 228 to communicate, access, and control one another, and to communicate with the common cloud network service provider. One of ordinary skill in the art will appreciate that these are examples of network devices, and that the network devices 202, 204, 206, 228 may include any other appropriate device.

The common cloud network service provider may include an IoT cloud network service provider. For example, the network devices 202, 204, 206, 228 may be registered with and may receive services from the IoT network service provider. The network 214 may include one or more cloud infrastructure systems that provide the services. The infrastructure system of the network 214 is operated by the IoT network service provider, and may include one or more servers. The IoT network service provider may provide various services to registered devices, such as registration (e.g., registration as described with respect to FIG. 8 below), feature customization, information storage, application support, firmware and other software maintenance, message routing to other registered devices, or the like. The IoT network service provider may also provide registered devices with the ability to remotely access, configure, and control other registered devices. For example, a user may operate an access device (local to or remote from the network 200) to access one or more of the network devices 202, 204, 206, 228 by sending a message to the IoT network service provider. The IoT network service provider may receive and process the message, and forward the necessary information to the destination device (e.g., network device 202, 204, 206, 228) according to the contents of the message. In some embodiments, the network devices 202, 204, 206, or 228 may share more than one common cloud network service provider. A common proprietary program may be a program or application provided by the common cloud network service provider. The program or application may allow the network devices 202, 204, 206, and 228 to interact with one another and with the common cloud network service provider. For example, the program or application may provide a proprietary application programming interface (API) to which only devices registered with the common cloud network service provider have access.

Access devices 208 and 212 may include any type of access device that can be used to access devices on the network 200, including one or more of the network devices 202, 204, 206, 228. For example, similar to the access device 108 described above, access devices 208 and 212 may include any human-to-machine interface with network connection capability that allows access to the network 200. The access devices 208 and 212 may also share a common cloud network service provider and/or proprietary program. For example, the access devices 208 and 212 may be registered with and receive services from a voice-over-Internet-Protocol (VoIP) network service provider. One of ordinary skill in the art will appreciate that any other appropriate network service provider may provide services to the network devices 202, 204, 206, or 228 and/or the access devices 208, 212.

In some embodiments, gateway 210 or a client device (e.g., a network device 202, 204, 206, 228, an access device 208, 212, or other device connected to network 200) communicating with the gateway 210 may select a particular frequency band to use for the communication. Once a band is selected, the gateway 210 or a client device may select one or more channels on which to send and receive communications between the gateway 210 and the client device. The number of channels that can be used at a given point in time depends on the number of transceiver radio circuits that the gateway 210 includes. For example, if the gateway 210 includes a single transceiver radio circuit for a first frequency band of a particular wireless technology (e.g., a 2.4 GHz WiFi transceiver radio circuit), the gateway 210 can communicate using a single channel from that frequency band at any given point in time. In some embodiments, a user may configure the gateway 210 to transmit and receive on a particular channel of a frequency band that is available for use by the gateway 210. In some embodiments, the gateway 210 may automatically select a channel based on the quality of the channel. For example, a user may configure the gateway 210 to select, or the gateway 210 may automatically select, channel 1 of the 2.4 GHz band if another gateway in the vicinity of the gateway is using channel 6, since channels 1 and 6 do not overlap. In some embodiments, the gateway 210 may listen for data traffic on other channels, and can switch from one channel to another channel to achieve better reception.

Once a channel is selected for use by a gateway 210, the gateway 210 may indicate to client devices trying to connect with the gateway that the devices must switch their transceiver radios to the channel in order to communicate with the gateway. For example, the gateway 210 may transmit a communication packet or frame with an indication of the channel. As illustrated in FIG. 2, each of the network devices 202, 204, 206, 228 and each of the access devices 208, 212 may establish a separate connection with the gateway 210 using the selected channel. The gateway 210 may maintain a continuous connection with each client device until the connection is terminated by either the gateway 210, the client device, or by external factors (e.g., loss of signal, or the like).

In some embodiments, the network devices 202, 204, 206, 228, the access devices 208, 212, and/or the gateway 210 may operate as nodes of a mesh network in order to route communications to different devices in the network 200. For example, the network devices 202, 204, 206, 228 may be programmed with a dynamic routing protocol (e.g., using programs, software, or the like) that enables the devices to interact within the network 200 in a mesh network topology. In some embodiments, only the network devices 202, 204, 206, 228 may communicate with one another in a mesh network topology due to the proprietary nature of the devices. In some embodiments, all devices 202, 204, 206, 208, 212, and 228 may be configured to operate using a common mesh network. A dynamic routing protocol may include the language a node of a mesh network speaks with other nodes to communicate information about the reachability and status of networks. The dynamic routing protocol may be used to determine routes that are stored in routing tables within each node, and also to update the routing tables stored by the nodes. In some cases, information may be communicated across the network 200 from node to node (device to device) by hopping wirelessly from one mesh node to the next. A connection between adjacent nodes or gateways may be referred to herein as a hop. Each node may discover and track neighboring nodes using the dynamic routing protocol. For example, the devices 202, 204, 206, 228 may use the dynamic routing protocol to exchange information about networks with which they are connected, information about destination addresses seen in received communication packets or frames, and other appropriate information. The nodes may be configured to automatically select an appropriate or best path through the network 200 (e.g., the quickest path, most reliable path, less congested path, a combination thereof, or the like) using the dynamic routing protocol. For example, for a destination device located equidistant from two nodes, the two nodes may select the node that provides the strongest signal to the destination device. In some embodiments, the dynamic routing protocol may be used to determine a next-best path if a determined best path to a destination becomes unusable. In some embodiments, a gateway (e.g., gateway 210 or other gateway not shown in FIG. 2) may be programmed with the dynamic routing protocol and may be able to select an appropriate or best path through the network 200. As one example of a routing protocol, the devices 202, 204, 206, 208, 212, 228 and/or the gateway 210 may be configured to operate according to a Hybrid Wireless Mesh Protocol (HWMP) defined in IEEE 802.11s. One of ordinary skill in the art will appreciate that any other appropriate routing protocol may be used.

In some embodiments, a series of metrics can be scored over time based on the communication performance over each hop or leg between device nodes on the network. For example, in the topology of the network 200 illustrated in FIG. 3, there are three hops or legs between gateway 210 and network device 228. Metrics may include uptime, average latency, throughput, packet loss, or the like. Each metric can have a different score associated with the characteristics of a particular hop's performance. Such scores can also be tracked over time as their performance fluctuates during different times during a day, a day of the week, or days of the year. Each of the node network devices 202, 204, 206, 228 can also have such metrics associated with them specifically. The metrics may be stored in a routing table within each node device. Selection of a next node to communicate with may include gathering all of the scores of each possible path and node, and determining from that data which path to the gateway 210 would be the optimum path for a given client device with a known set of data transmission requirements. In some cases, two different client devices may make two different path selections given the exact same topology of nodes, hops, and their associated performance scores based on the unique data transmission needs of the client and application on the client device. For example, browser traffic, E911, and movie streaming may have different priorities when it comes to deciding on which metric to rate higher than another when deciding on the optimum path.

Similar to that described above with respect to multiple device connections being maintained by a gateway, the network devices 202, 204, 206, 228 and access devices 208, 212 may establish separate mesh-network connections with other of the devices 202, 204, 206, 208, 212, 228 devices using different channels. A device 202, 204, 206, 208, 212, or 228 may maintain a continuous connection with a device with which it is connected until the connection is terminated.

A frequency channel has a restricted amount of bandwidth capability. As more and more client devices establish connections with, for example, the gateway 210 using the channel selected for use by the gateway 210, the gateway 210 may begin to choke on the processing (e.g., multiplexing, routing, and other processes needed to send communications to and from client devices) that is required to respond to all of the client devices. For example, the number of packets that are lost and that have to be retransmitted starts to increase once a certain number of client devices connect to the gateway using the channel. The same issue applies when a node in a mesh network maintains connections with multiple other nodes on the mesh network. As a result, once the number of connected client devices approaches a threshold number, the efficiency of the gateway or mesh node to maintain the different client device connections and to deliver quality service across all of the client devices is negatively impacted, causing the overall network performance to degrade. The threshold number of client devices depends on the capabilities of the gateway or mesh node. For example, a gateway may be able to effectively handle communications to and from up to 10 client devices, 20 client devices, 30 client devices, 100 client devices, or any other appropriate number of client devices.

It is desirable to provide a user with optimal network performance when communicating on a network. Accordingly, techniques and systems are described herein for operating a device as a communication proxy for other client devices to reduce the number of connections to a gateway or a node in a mesh network. For example, one or more of the network devices 202, 204, 206, 228 or the access devices 208, 212 may operate as a proxy device for one or more of the other devices 202, 204, 206, 208, 212, 228 by exchanging communications with the gateway 210 over the proxy device's connection with the gateway 210. The proxy device may transmit and receive communications to and from the gateway 210 for the other devices. In another example, one or more of the network devices 202, 204, 206, 228 or the access devices 208, 212 may operate as a proxy device for one or more of the other devices 202, 204, 206, 208, 212, 228 by exchanging communications with the a mesh node (e.g., network devices 202, 204, 206, 228) over the proxy device's connection with the mesh node. By operating a device as a proxy for other devices, the number of connections to the gateway 210 or mesh node is reduced by the number of devices that use the proxy device to communicate with the gateway 210 or mesh node. By reducing the number of connections to the gateway 210 or mesh node, more of the bandwidth capability of each connection with the gateway 210 or mesh node may be utilized to exchange communications. Furthermore, reducing the number of connections reduces communication latency that is experienced by client devices.

Figure 3:
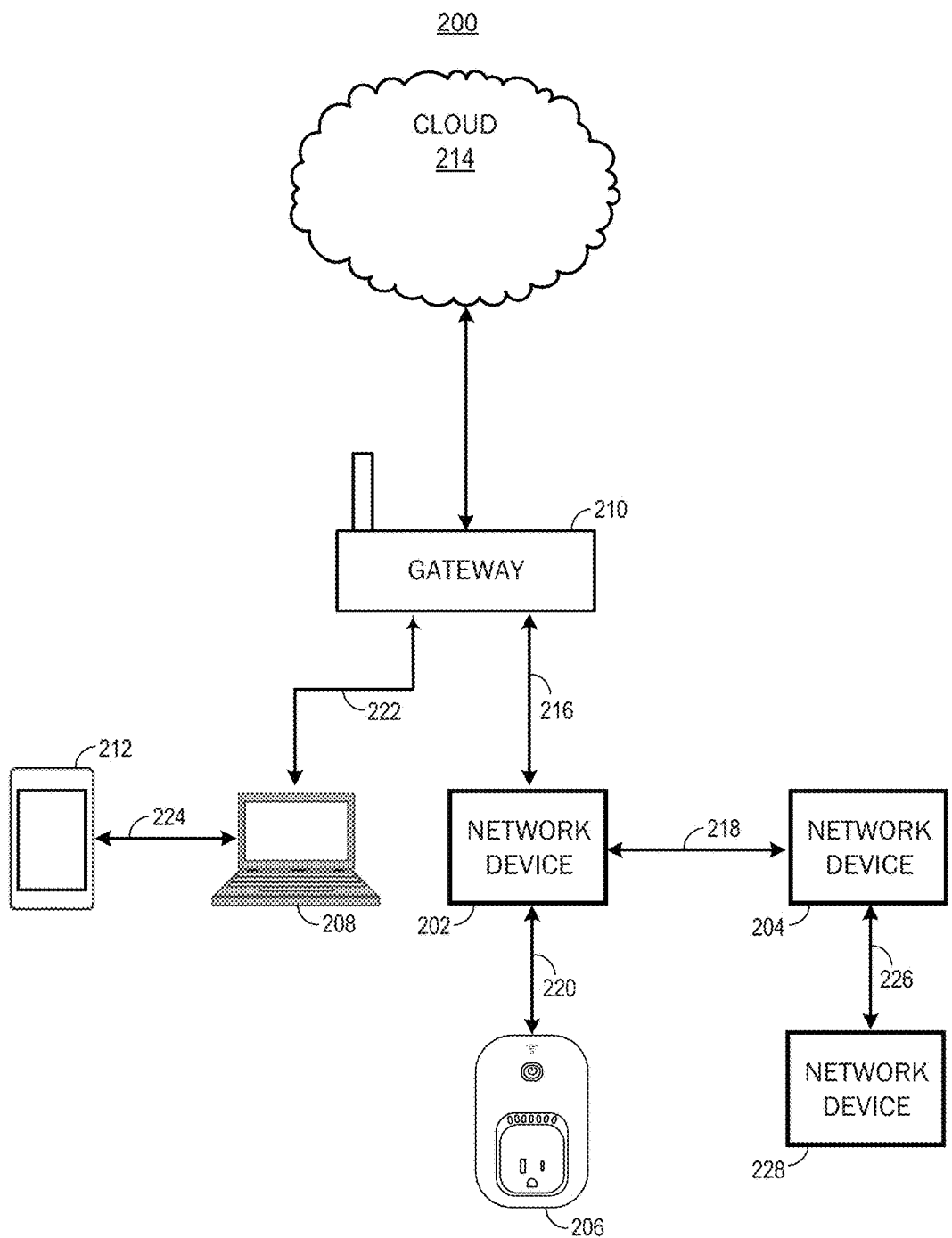
FIG. 3 is an illustration of another example of a network environment, in accordance with some embodiments.

FIG. 3 illustrates an example of the network 200 with network device 202, 204 and access device 208 operating as communication proxy devices. While two of the client devices are shown as operating as proxy devices in FIG. 3, one of ordinary skill in the art will appreciate that any number of network devices or access devices may operate as proxy devices for other devices connected to the network 200.

In some embodiments, the gateway 210 may communicate with connected devices using channel 11 of the 2.4 GHz frequency band. One of ordinary skill in the art will appreciate that any available channel of any appropriate frequency band, including those that are currently in use or that may become available at a future date, may be used to exchange communications with the gateway 210. The gateway 210 may only be able to communicate using one channel at a time for each frequency band for which it has a transceiver radio. Accordingly, client devices may be required to connect to a particular channel (channel 11 in some examples described herein) to communicate with the gateway 210 over a particular frequency band.

As previously described, the network devices 202, 204, 206, 228 may include IoT devices that share a common cloud network service provider and/or a common proprietary program. Further, the network devices 202, 204, 206, and 228 may be manufactured by a common manufacturer that maintains or otherwise operates the common cloud network service provider. The network devices 202, 204, 206, 228 may thus be configured to communicate with, access, and control other of the network devices 202, 204, 206, 228 directly or via the common cloud network service provider. In addition to performing IoT functionalities specific to each network device 202, 204, 206, 228 (e.g., operating as an automation switch and communicating with other network devices and the common cloud network service provider, operating as a light switch and communicating with other network devices and the common cloud network service provider, or the like), the network devices 202, 204, 206, 228 may also operate as proxy devices for other of the devices that share the common cloud network service provider. For example, any of the network devices 202, 204, 206, or 228 may operate as a proxy device for another network device 202, 204, 206, or 228 to exchange IoT-specific communications or data with the gateway 210 or to another device that shares the common cloud network service provider. Accordingly, the network devices 202, 204, 206, 228 may operate as an IoT device and also a proxy device for other IoT devices that share a common cloud network service provider or common proprietary program. Other devices that do not share the cloud network service provider or the common proprietary program may not be able to utilize any of the network devices 202, 204, 206, or 228 as a proxy device. In some examples, the network device 202 may act as a proxy device for network device 204, network device 206, and network device 228 to exchange communications with the gateway 210 for the network devices 204, 206, 228. To establish a connection 216 and communicate with the gateway 210, the network device 202 must switch its transceiver radio that is configured to communicate on the 2.4 GHz frequency band to channel 11. The network device 202 can then exchange communications over the connection 216 with the gateway 210 for itself and for the network devices 204, 206, and 228. The network device 204 may also operate as a communication proxy device for network device 228 to exchange communications with the network device 202 for the network device 228.

In some examples, the access device 208 may operate as a proxy device for access device 212. The access device 208 must switch its 2.4 GHz frequency band transceiver radio to channel 11 to communicate with the gateway 210 over connection 222. The access device 208 can then communicate with the gateway 210 for itself and for the access device 212.

By operating as proxy devices, the network device 202 and the access device 208 can work in conjunction with the gateway 210 to offload the client radio transmission requirements of the gateway 210 by reducing the number of connections the gateway 210 has to maintain. The gateway 210 only has to maintain two connections 216 and 222 for all six devices 202, 204, 206, 228, 208, and 212. Furthermore, by operating the network device 204 as a proxy device for network device 228, the load on the network device 202 acting as a mesh node is reduced because only one connection 218 is established for both network devices 204 and 228. While the embodiment illustrated in FIG. 3 are described with network device 202 and access device 208 operating as proxy devices, any other network device or access device may also operate as a proxy device for other access devices or network devices.

The proxy devices may be selected to operate as proxies based on various factors. For example, network device 202 may have the strongest connection with and may receive the strongest signals from the gateway 210 out of the devices 202, 204, 206, and 228, and thus may be chosen as the proxy for these devices. Further, the signals received by the access device 208 from the gateway 210 may be stronger than the signals received by access device 212, causing the access device 208 to be chosen as the proxy. As another example, the network device 202 or the access device 208 may be selected as a proxy device based on particular communications capabilities. For example, either of the network device 202 or the access device 208 may have more than one transceiver radio for a particular frequency band (e.g., 2.4 GHz, 5 GHz, or any other frequency band that is currently available or that may become available at a future date). As another example, either of the network device 202 or the access device 208 may have higher processing power than the devices 204, 206, 212, 228 that are using the network device 202 or the access device 208 as a proxy.

In some embodiments, a proxy device can also be selected based on its current load, historical load, number of other devices that are already proxying through it, the number of hops away from the gateway, historical uptime, packet loss, MOS score, and/or wireless channel noise. In some embodiments, the proxy device may be selected based on capabilities of the device being cross referenced with the type of traffic a device may need to proxy through the proxy device (e.g. high definition media that may require high throughput but can tolerate some latency versus low throughput for required extremely low latency). In some embodiments, historical uptime may be a history of connectivity of a device that may be used as a factor in determining whether the device should be selected as a proxy device. For example, the network device 202 may be connected to the gateway 210 or other device for the longest amount of time (max uptime) and may have historically good throughput, low latency, and/or signal strength during the connectivity period.

One of ordinary skill in the art will appreciate that other appropriate factors may also be considered in choosing a client device as a proxy device. As explained further below with respect to FIG. 5, client devices may be grouped based on geographic location, device functionality, device type, or other factors, and a proxy may be selected from among the client devices in each group.

The devices 204, 206, 212, and 228 that use the network device 202 and access device 208 as communication proxies for communicating with the gateway 210 may be within a range of signals transmitted by the gateway 210 and are able to access the network provided by the gateway 210. However, the devices 204, 206, and 212 may connect with the proxy network device 202 and access device 208 instead of the gateway 210 in order to reduce the number of direct connections from clients to the gateway 210. Similarly, the network device 228 may be within communication range of network device 202, but may connect with the proxy network device 204 instead of the network device 202 based on one or more of the metrics described above.

Using the network devices 202 and 204 as examples of proxy devices, the network devices 202 and 204 may establish a connection 218 for exchanging communications between one another. The network device 202 and the network device 206 may also establish a connection 220 for exchanging communications. The network device 204 and the network device 228 may also establish connection 226 for exchanging communications. In some embodiments, the connections 218, 226, and/or 220 may be established using the same frequency channel as that used by the network device 202 to communicate with the gateway 210 over connection 216, such as channel 11 of the 2.4 GHz frequency band. In such embodiments, the network device 202 only needs to have a single transceiver radio for a particular frequency band (e.g., 2.4 GHz band), but may also have two or more transceiver radios for the frequency band. In some embodiments, the connections 218 and/or 220 may be established using a different frequency channel than that used for connection 216 between the gateway 210 and the network device 202, such as channel 6 of the 2.4 GHz frequency band. In such embodiments, the network device 202 may have two or more transceiver radios for the particular frequency band for which the two frequency channels belong.

In some examples, the network device 204 or any other client device may transmit a communication (e.g., one or more communication packets or frames) that is destined for a device, system, or other destination. The destination device, system, or other destination may be external to the network 200 or may be within the network 200. A device or system that is within or internal to the network 200 may be a device or system that is within the range of signals transmitted by the gateway 210 or other devices in the network that can provide network connectivity (e.g., nodes of a mesh network, other gateways that are part of the network 200, or the like) and that is able to access the network provided by the gateway 210. All other devices or systems may be considered to be external to or outside of the network 200. When a communication is to be transmitted outside of the network 200, the communication must be processed by the gateway 210 so that the gateway 210 can route the communication to its destination.

In some examples, the proxy network device 202 may receive the communication transmitted by the network device 206. In some embodiments, the proxy network device 202 may determine that the communication is transmitted by the network device 206. For example, each communication frame or packet communicated among the devices and gateways of the network 200 may include an identifier (e.g., a MAC address or other identifier) of the device from which the communication frame originates (a source address) and also an identifier of the device to which the communication frame is destined (a destination address). In some embodiments, the communication frame or packet may also include an identifier (e.g., a MAC address or other identifier) of the device from which the communication was transmitted (transmitter address) and also an identifier of the next device that is to receive the communication (receiver address). In some cases, the transmitter address may be the same as the source address in the event the communication is transmitted by the device from which the communication originates. In some cases, the receiver address may be the same as the destination address in the event the communication is to be transmitted to the device to which the communication is destined. The proxy network device 202 may determine that the communication is received from the network device 206 based on an identifier (e.g., a MAC address or other identifier) included in a source address and/or a transmitter address included in a frame or packet of the communication. In some embodiments, the proxy network device 202 may not determine the device from which the communication is transmitted, and may only determine where to transmit the communication, if needed.

The proxy network device 202 may then determine whether a destination for the communication is internal or external to the network 200. The proxy network device 202 may determine the destination for the communication based on an identifier (e.g., a MAC address or other identifier) included in a destination address of a frame or packet of the communication. In the event the proxy network device 202 determines that the destination is external to the network 200, the proxy network device 202 may forward or re-transmit the communication over the connection 216 for further processing and routing by the gateway 210. The gateway 210 may then transmit the communication to the cloud network 214 so that the communication can reach its destination.

In the event the proxy network device 202 determines that the destination is within the network 200, the network device 202 may forward the communication to an appropriate client device or gateway within the network 200, such as the network device 204, 206, or another device shown or not shown in FIG. 3 that shares the common cloud network service provider or proprietary program. In some examples, one or more routing protocols, as described above, may be used by the network device 202 to determine an appropriate device within the network 200 to which to send the communication. The proxy network device 202 may refer to a destination address in the received communication, and may search a routing table to determine if the network device 202 is connected to the destination device to which the destination address belongs. For example, in the event that the network device 202 is directly connected to the destination device (e.g., network device 204), the network device 202 may send the communication directly to the destination device. In another example, the network device 202 may not be directly connected to the destination device (e.g., network device 228), and may send the communication to another device (e.g., network device 204) prior to the communication reaching the destination device. The routing table stored by the network device 202 may indicate the best route in which to send the communication so that the network device 202 determines the appropriate next device to which to send the communication. The communication may be forwarded from one device to another through the network 200 until the communication is received at the intended destination. In some embodiments, the proxy network device 202 may forward the communication to the gateway 210 without determining whether the destination for the communication is internal or external to the network 200, in which case the gateway 210 may determine whether to send the communication to a device within the network 200 or to a device or system external to the network 200.

As noted above, the network device 204 may also operate as a proxy device for the network device 228. The network device 228 may send communications to network device 204, and the network device 204 may then send the communication to the proxy network device 202. Accordingly, the network device 204 may operate as a proxy between network devices 202 and 228 so that only a single connection 218 is established with the network device 202 for both network devices 204 and 228. At the same time, the network device 202 may operate as a proxy device for both network devices 204 and 228, as well as for network device 206. In some cases, the network device 228 may send a particular communication directly to the proxy network device 202 in the event it determines, based on one or more metrics in its routing table, that it should not use the network device 204 as a proxy for the particular communication.

In one example, the network device 228 may transmit a communication over connection 226 to network device 204. The network device 204 may determine whether a destination for the communication is internal or external to the network 200. For example, the network device 204 may read identification information (e.g., a media access control (MAC) address, or other identifier) in the communication packet or frame to determine the intended destination for the packet. The network device 204 may then send the communication to a next device based on the determination. In the event the network device 204 determines that the communication is to be ultimately received by a device within the network 200, the network device 204 may send the communication to the destination device, to the proxy network device 202 for routing to the destination device, or to another device within the network 200 (e.g., according to a routing protocol and/or a routing table). In the event the network device 204 determines that the communication is destined for a device or system external to the network 200, the network device 204 may send the communication to the proxy network device 202. The proxy network device 202 may then re-transmit or send the communication to the gateway 210, which may then transmit the communication to the cloud network 214 so that the communication can reach its destination.

The proxy access device 208 may operate as a proxy device for access device 212 in a similar manner as that described above with respect to the proxy network device 202. For example, the proxy access device 208 and the access device 212 may establish a connection 224 for exchanging communications between one another. In some embodiments, the connection 224 may be established using the same frequency channel as that used by the access device 208 to communicate with the gateway 210 over connection 222, such as channel 11 of the 2.4 GHz frequency band. In such embodiments, the access device 208 may have a single transceiver radio for a particular frequency band (e.g., 2.4 GHz band) or may have two or more transceiver radios for the frequency band. In some embodiments, the connection 224 may be established using a different frequency channel than that used for connection 222 between the gateway 210 and the access device 208, such as channel 6 of the 2.4 GHz frequency band. In such embodiments, the access device 208 may have two or more transceiver radios for the particular frequency band for which the two frequency channels belong.

In some examples, the access device 212 may transmit communications (e.g., one or more communication packets or frames) that are destined for one or more device, systems, or other destinations that may be external to the network 200 or that may be internal to the network 200. Communications that are to be transmitted to devices or systems outside of the network 200 must be processed by the gateway 210 so that the gateway 210 can route the communications to the appropriate destinations. Communications that are destined for devices internal to the network 200 may be routed to the next appropriate device within the network 200 (e.g., the destination device or another device other than the destination device). As described above, routing protocols and routing tables may be used by the access device 208, the access device 212, and/or the gateway 210 to determine an appropriate route for the communications.

In one example, the access device 212 may transmit a communication over connection 224 to access device 208. The access device 208 may determine whether a destination for the communication is internal or external to the network 200. For example, the access device 208 may read identification information (e.g., a media access control (MAC) address, or other identifier) in the communication packet or frame to determine the intended destination for the packet. The access device 208 may then send the communication to a next device based on the determination. In the event the access device 208 determines that the communication is to be ultimately received by a device within the network 200, the access device 208 may send the communication to the destination device, to the gateway 210, or to another device within the network 200 (e.g., according to a routing protocol and/or a routing table). In the event the access device 208 determines that the communication is destined for a device or system external to the network 200, the access device 208 may send the communication to the gateway 210. The gateway 210 may then transmit the communication to the cloud network 214 so that the communication can reach its destination. In some embodiments, the proxy access device 208 may forward the communication to the gateway 210 without determining whether the destination for the communication is internal or external to the network 200, in which case the gateway 210 may determine whether to send the communication to a device within the network 200 or to a device or system external to the network 200.

The gateway 210 may receive communications from the cloud network 214 or other external networks that are destined for one or more devices within the network 200. For example, the gateway 210 may receive a communication from the common cloud network service provider with which the network devices 202, 204, 206, 228 are registered. The gateway 210 may determine where the communications should be routed to within the network 200. For example, the gateway 210 may receive a communication from the cloud network 214 that is to be ultimately received by the network device 228. The gateway 210 may determine an identity of the destination device based on an identifier (e.g., a MAC address or other identifier) that is included in the communication. Using the identifier, the gateway 210 may refer to a network address translation table, a routing table, or other reference source to determine to which device to send the communication so that it can reach its destination. The gateway 210 may determine that it is not directly connected directly to the destination network device 228, and may decide to transmit the communication to the proxy network device 202 over connection 216. The network device 202 may determine the identity of the destination device for the communication based on the identifier in the communication, and may also determine that it is not directly connected to the destination network device 228. In response, the network device 202 may refer to its mesh routing table or other reference source and may determine to transmit the communication to the proxy network device 204. Once the network device 204 receives the communication, it may determine the identity of the destination device using the identifier. Using the identifier, the network device 204 may refer to a mesh routing table or other reference source to determine that it is directly connected to the network device 228. The network device 204 may then transmit the communication to the destination network device 228.

Using the network configuration illustrated in FIG. 3, communications may be processed by the gateway 210 for all of the devices 202, 204, 206, 208, 212, and 228 within the network 200 while direct connections are only established between the gateway 210 and two proxy devices 202 and 208. As described above, the proxy devices 202 and 208 exchange communications with the gateway 210 for the other devices 204, 206, 212, and 228. By operating the network devices 202 and 208 as proxies for the other devices 204, 206, 212, and 228, the number of connections that must be maintained by the gateway 210 is greatly reduced, leading to reduced latency and maximizing use of the bandwidth capability of each connection with the gateway 210 to exchange communications. Furthermore, by operating network device 204 as a proxy device for network device 228, the number of connections maintained by the network device 202 is reduced to one for both the network devices 204 and 228.

Figure 4:
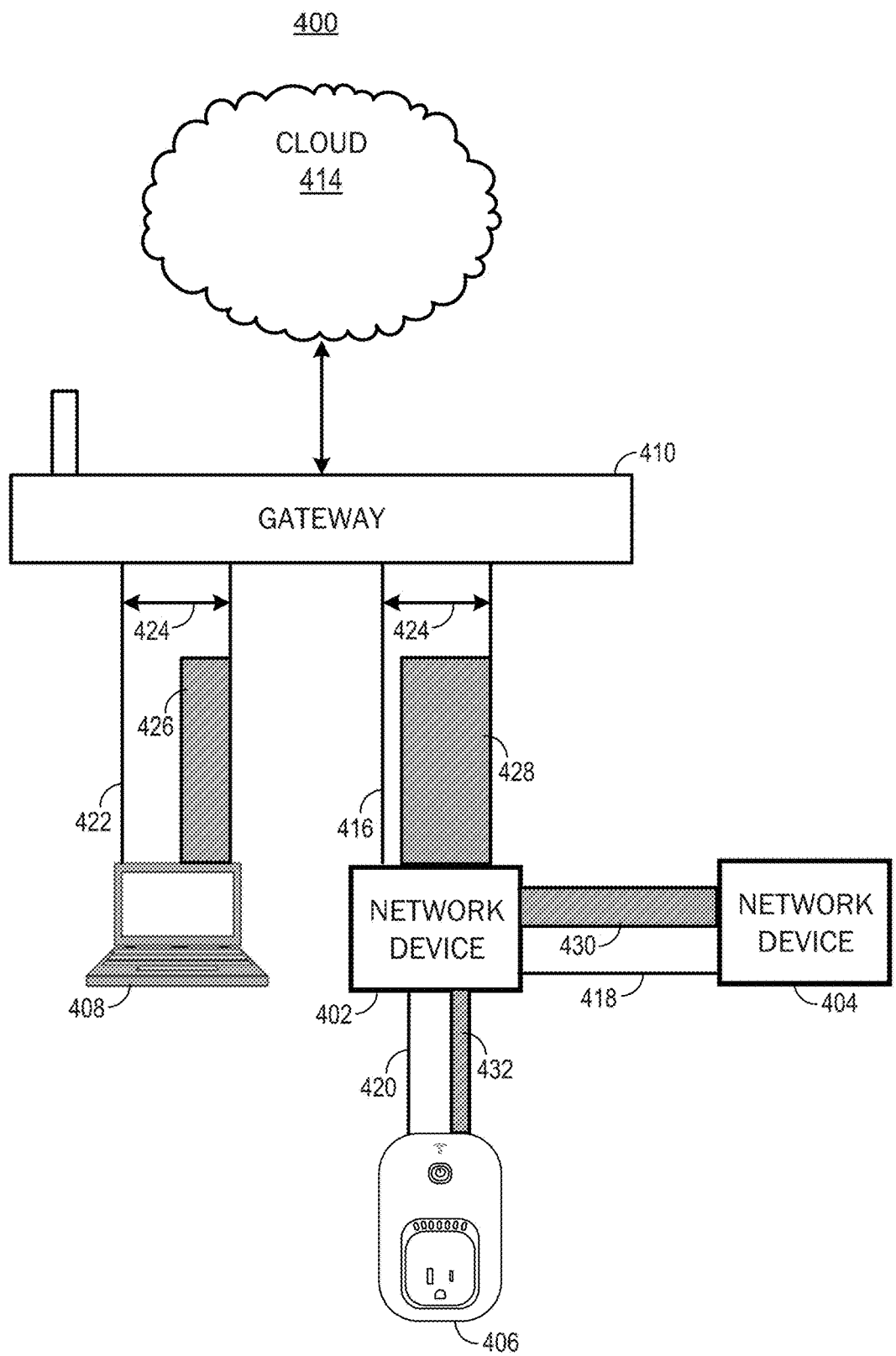
FIG. 4 is an illustration of channel bandwidth used by a proxy device, in accordance with some embodiments.

FIG. 4 illustrates an example of benefits obtained by operating one or more devices as a proxy device for other devices. Similar to the local area network 100 and the network 200 described above, the network 400 includes network devices 402, 404, 406, access device 408, gateway 410, and an external network 414. The gateway 410, the network devices 402, 404, 406, the access device 408, and the external network 414 may be similar and have the same functionalities and capabilities as the gateways 110, 112, or 210, the network devices 102, 104, 106, 202, 204, 206, or 228, the access devices 108, 208, or 212, and the external networks 114 or 214 described above with respect to FIGS. 1-3. It should be appreciated that the network 400 may have other components than those depicted. Further, the embodiment shown in the figure is only one example of a network that may incorporate an embodiment of the invention. In some other embodiments, network 400 may have more or fewer components than shown in the figure, may combine two or more components, or may have a different configuration or arrangement of components. For example, while a certain number of network devices, access devices, and gateways are shown in FIG. 4, one of ordinary skill in the art will appreciate that any number of network devices, access devices, and gateways may be included in the network 400.

In some embodiments, the gateway 410 may communicate with connected devices using channel 11 of the 2.4 GHz frequency band. One of ordinary skill in the art will appreciate that any available channel of any appropriate frequency band, including those that are currently in use or that may become available at a future date, may be used to exchange communications with the gateway 410. The gateway 410 may only be able to communicate using one channel at a time for each frequency band for which it has a transceiver radio. Accordingly, client devices may be required to connect to a particular channel (channel 11 in some examples described herein) to communicate with the gateway 410 over a particular frequency band.

In some examples, the network device 402 may act as a proxy device for network device 404 and for network device 406. To establish a connection 416 and communicate with the gateway 410, the network device 402 switches its transceiver radio that is configured to communicate on the 2.4 GHz frequency band to channel 11. The network device 402 can then exchange communications over the connection 416 with the gateway 410 for itself and for the network devices 404 and 406. The access device 408 may not act as a proxy device for any other devices and thus may exchange communications with the gateway 410 using connection 422 only for itself. While the embodiment illustrated in FIG. 4 are described with network device 402 operating as a proxy device, other devices including network devices, access devices, or other client devices may also operate as a proxy device for other client devices that share a common cloud network service provider and/or a common proprietary program.

Each connection 422 and 416 has a maximum available bandwidth 424. The maximum available bandwidth 424 is the maximum amount of data that can be transmitted at any particular point in time using the channel over which the connections 416 and 422 are established (channel 11 in some examples). The maximum available bandwidth 424 is a function of the channel over which the connections 416 and 422 are established. For example, the maximum available bandwidth 424 may be the difference between the highest and lowest frequencies that make up the channel. Other factors may contribute to the maximum available bandwidth 424, such as dispersion and loss characteristics of the channel, the equipment used to transmit and receive the signals over connections 416 and 422 (e.g., components of the network device 402, access device 408, and the gateway 410), or any other known factor.

The access device 408 may use up to a portion 426 of the maximum available bandwidth 424. The portion 426 of the maximum available bandwidth 424 that is used by the network 408 is a small fraction of the total bandwidth that is available, such as only 40% of the total available bandwidth. By only exchanging communications over connection 422 with the gateway 410 for itself, the network device 408 does not maximize the use of the channel 422. On the other hand, the network device 402 exchanges communications for itself and for network devices 404 and 406, and thus uses more of the maximum available bandwidth 424 than the access device 408. For example, the network device 402 may use up to a portion 428 of the maximum available bandwidth 424. The portion 428 may include the portion 430 of bandwidth used by one or more communications transmitted to the network device 402 from the network device 404, the portion 432 of bandwidth used by one or more communications transmitted to the network device 402 from the network device 406, and/or a portion (not shown) of bandwidth attributable to communications originating from or destined for network device 402. The portion 428 may be a larger percentage of the maximum available bandwidth 424 than the portion 426. For example, the portion 428 may be 95% of the maximum available bandwidth 424. One of ordinary skill in the art will appreciate that other portions of the maximum available bandwidth 424 may be used by the network device 402 or access device 408, such as any portion from 0% to 100%, depending on the amount of data traffic being communicated at any given point in time. Because the maximum available bandwidth 424 is not exceeded by the portion 428 of the bandwidth utilized by network device 402 when exchanging communications for itself, the network device 402, and the network device 406, the communication performance of the channel 416 is not compromised. Accordingly, the illustration of FIG. 4 shows that the network device 402 can maximize the use of the maximum available bandwidth 424 by acting as a proxy device for network device 406 and access device 404. For example, latency can be reduced when the amount of communication traffic begins to reach a maximum threshold with respect to any of the resources that are utilized to manage the traffic among the various devices in a network. These resources include bandwidth, processing capacity, memory, number of processes being performed by a computer (e.g., process thrashing), or any other appropriate resource used in the network. A proxy device can be used to offload some traffic from the gateway or other device, thus freeing up resources for the gateway or other device and ultimately reducing latency experienced by devices on the network.

As previously described, various factors and metrics are considered when selecting a device as a proxy device, such as signal strength with respect to signals being received from a gateway or other device to which communication is desired, communication capabilities (e.g., number of transceiver radios, processing power, or the like), current load, historical load, number of other devices that are already proxying through it, the number of hops away from the gateway, historical uptime, packet loss, MOS score, wireless channel noise, and/or capabilities with respect to type of traffic that is to be communicated. Furthermore, as previously described, metrics that are stored for each hop or leg between nodes in a mesh network may be analyzed to determine a best proxy node and leg to use for transmitting a particular communication. Accordingly, numerous factors and metrics are considered, in addition to bandwidth availability, when choosing a proxy device.

Figure 5:
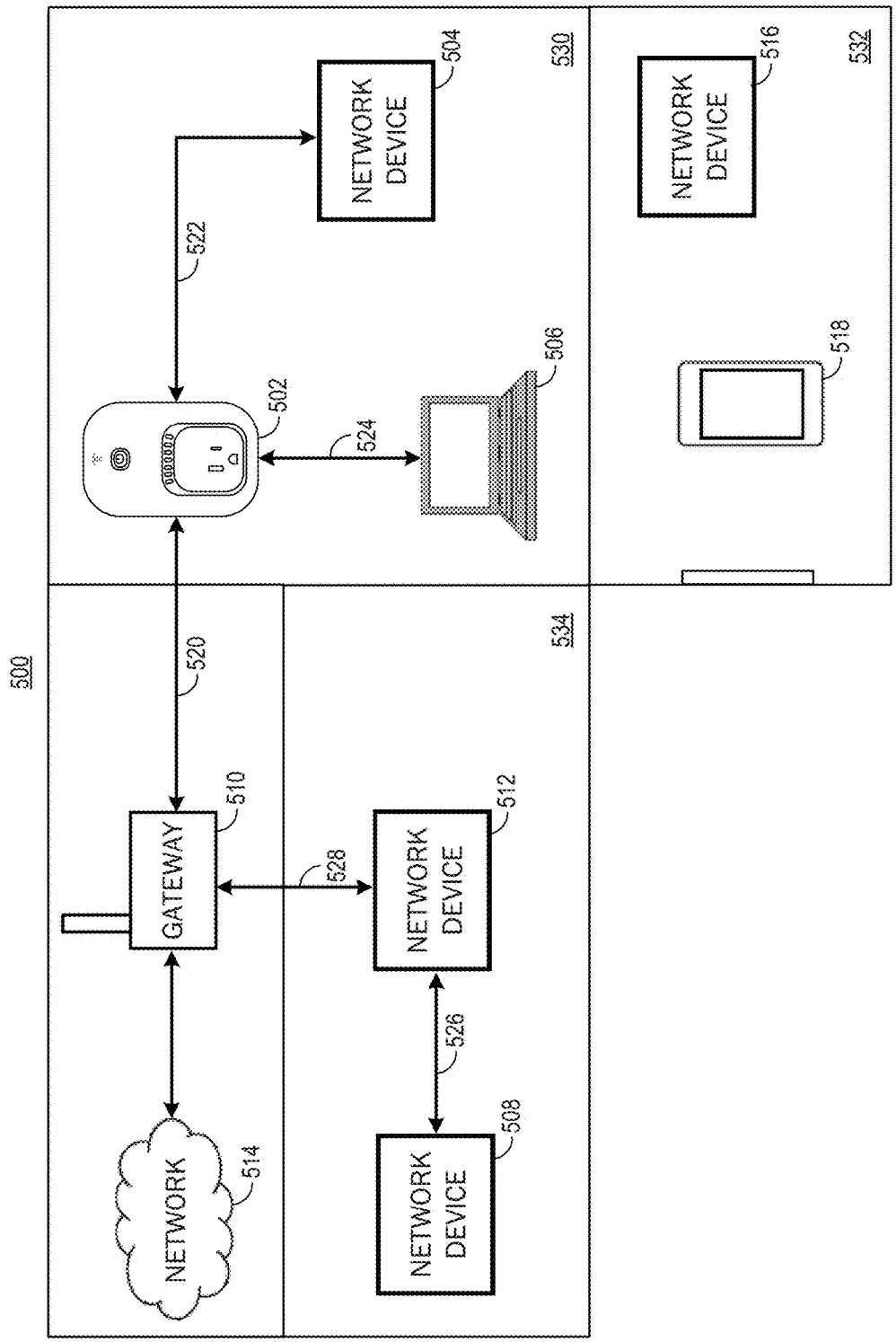
FIG. 5 is an illustration of another example of a network environment, in accordance with some embodiments.

FIG. 5 illustrates an example of a network 500. Similar to the local area networks 100 and 200 described above, the network 500 includes network devices 502, 504, 508, 512, 516, access devices 506, 518, gateway 510, and an external network 514. The gateway 510, the network devices 502, 504, 508, 512, 516, the access devices 506, 518, and the external network 514 may be similar and have the same functionalities and capabilities as the gateways 110, 112, or 210, the network devices 102, 104, 106, 202, 204, 206, or 228, the access devices 108, 208, or 212, and the external networks 114 or 214 described above with respect to FIGS. 1-3. It should be appreciated that the network 500 may have other components than those depicted. Further, the embodiment shown in the figure is only one example of a network that may incorporate an embodiment of the invention. In some other embodiments, network 500 may have more or fewer components than shown in the figure, may combine two or more components, or may have a different configuration or arrangement of components. For example, while a certain number of network devices, access devices, and gateways are shown in FIG. 5, one of ordinary skill in the art will appreciate that any number of network devices, access devices, and gateways may be included in the network 500.

In some embodiments, the gateway 510 or a client device (e.g., a network device 502, 504, 508, 512, 516, an access device 506, 518, or other device connected to network 500) communicating with the gateway 510 may select a particular frequency band to use for the communication. Once a band is selected, the gateway 510 or a client device may select one or more channels on which to send and receive communications between the gateway 510 and the client device. In some examples, the gateway 510 may communicate with connected devices using channel 6 of the 2.4 GHz frequency band. One of ordinary skill in the art will appreciate that any available channel of any appropriate frequency band, including those that are currently in use or that may become available at a future date, may be used to exchange communications with the gateway 510. The gateway 510 may only be able to communicate using one channel at a time for each frequency band for which it has a transceiver radio. Accordingly, client devices may be required to connect to a particular channel (channel 6 in some examples described herein) to communicate with the gateway 510 over a particular frequency band.

In some examples, a particular client device may operate as a proxy device for all other client devices that are located in a common geographic location. For example, the network device 502 may act as a proxy device for all devices located in room 530, including network device 506 and access device 504. In some cases, the room 530 may include a kitchen, the network device 504 may include an appliance (e.g., a slow cooker, a refrigerator, an oven, one or more lights, or the like) and the access device 506 may include a laptop computer. To establish a connection 520 and communicate with the gateway 510, the network device 502 may switch its transceiver radio that is configured to communicate on the 2.4 GHz frequency band to channel 6. The network device 502 can then exchange communications over the connection 520 with the gateway 510 for itself and for the network device 504 and the access device 506, similar to the proxy devices described above with respect to FIGS. 2-4. As another example, the network device 512 may operate as a proxy device for client devices located in room 534, including the network device 508. The network device 512 may switch its transceiver radio that is configured to communicate on the 2.4 GHz frequency band to channel 6 in order to establish connection 528 with the gateway 510. The network device 512 can then communicate with the gateway 510 for itself and for the network device 508. In some embodiments, neither the network device 516 nor the access device 518 located in the room 532 may act as a proxy device for one another. For example, the access device 518 may be too transient to be considered as being located in the room 532, and thus may establish its own connection (not shown) to the gateway 510. The network device 516 may also establish its own connection (not shown) to the gateway 510.

Devices may be determined to be in a common geographic location based on various techniques. For example, a user may designate devices as being located in a common geographic location. In such examples, the user may designate devices 502, 504, and 506 as being kitchen devices, and may designate devices 508 and 512 as being living room devices. As another example, a device may determine other devices that are located within proximity of the device using location information received form the other devices, such as global positioning system (GPS) coordinates, signal triangulation information, or the like. In another example, signal strength may be detected and used to determine how close a device is to another device. In yet another example, a device may determine that it is a certain number of hops from another device, and may determine proximity to the other device based on the number of hops. In such examples, any device located within a particular distance from the device (e.g., 1 foot, 2 feet, 3 feet, 5 feet, 10 feet, or any other appropriate distance) may be considered to be located within a common geographic location.

Various factors may be considered in selecting a client device located within a geographic location to operate as a proxy for other client devices located within the geographic location. For example, a client device with the strongest connection with and that receives the strongest signals from the gateway 510 out of other client devices may be chosen as the proxy for the other devices. As another example, a client device may be selected as a proxy device based on particular communications capabilities, such as a number of transceiver radios for a particular frequency band (e.g., 2.4 GHz, 5 GHz, or any other frequency band that is currently available or that may become available at a future date). As another example, an amount of processing power of a client device relative to other client devices may be used as a factor in selecting the client device as a proxy device for the other client devices. Other factors may include current load, historical load, number of other devices that are already proxying through it, the number of hops away from the gateway, historical uptime, packet loss, MOS score, wireless channel noise, and/or capabilities with respect to type of traffic that is to be communicated. Furthermore, as previously described, metrics that are stored for each hop or leg between nodes in a mesh network may be analyzed to determine a best proxy node and leg to use for transmitting a particular communication. One of ordinary skill in the art will appreciate that other appropriate factors may also be considered in choosing a client device as a proxy device.

Client devices may be grouped according to other common characteristics that the client devices share, such as based on device functionality, device type, or other characteristics. A proxy may be selected from among the client devices in each group.

Figure 6:
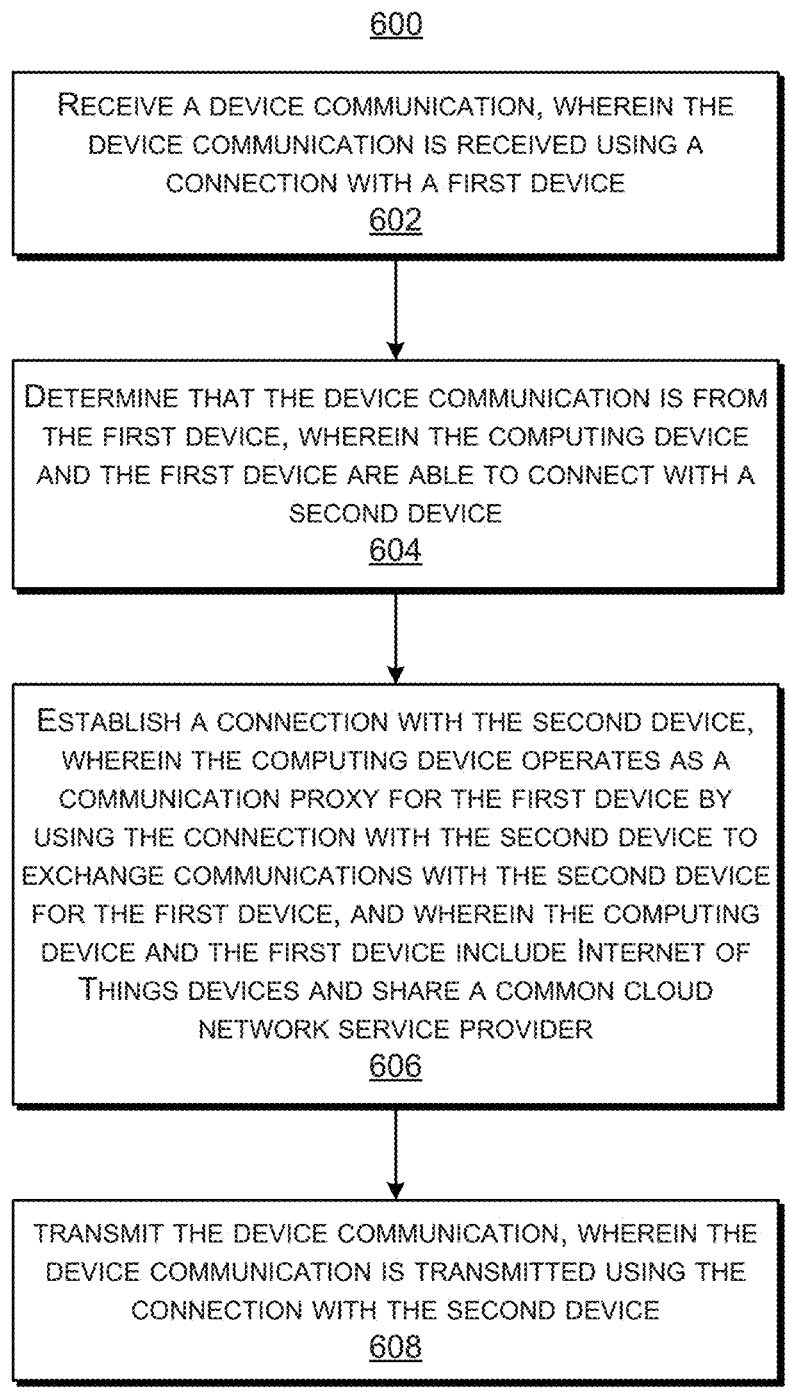
FIG. 6 is a flowchart illustrating an embodiment of a process of operating a computing device as a communication proxy for a device, in accordance with some embodiments.

FIG. 6 illustrates an embodiment of a process 600 of operating a computing device as a communication proxy for a device. In some aspects, the process 600 may be performed by a computing device, such as a network device 202, 204, 206, 228, 402, 404, 406, 502, 504, 508, 512, 516 or an access device 208, 212, 408, 506, 518 shown in FIGS. 3-5. While specific examples may be given of a client device, such as network device or access device, performing the process 600, one of ordinary skill in the art will appreciate that other devices may perform the process 600.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 602, the process 600 includes receiving, on a computing device, a device communication, wherein the device communication is received using a connection with a first device. At 604, the process 600 includes determining that the device communication is from the first device, wherein the computing device and the first device are able to connect with a second device. The second device may include a gateway or an IoT device. The gateway or the IoT device may provide client devices with access to a network (e.g., a local area network, a personal area network, or other appropriate network). In some examples, the computing device may be an IoT device, such as one of the network devices described above, acting as a proxy for the first device. The first device may also be an IoT device, such as one of the network devices described above. The computing device may determine that the communication is received from the first device based on an identifier (e.g., a MAC address or other identifier) included in a frame or packet of the device communication. In one example, the identifier may be an identifier that is designated in the frame or packet for the device from which the device communication originates (a source address). In another example, the identifier may be an identifier that is designated in the frame or packet for the device from which the device communication was transmitted (transmitter address), which may in some cases be the same as the source address in the event the communication is transmitted by the device from which the communication originates. Using FIG. 3 as an example, the network device 202 may receive a communication from network device 204 over connection 218. The network device 202 may determine that the communication is received from the network device 204 based on an identifier (e.g., a MAC address or other identifier) included in a source address and/or a transmitter address field of a frame or packet of the device communication. As noted, the computing device and the device are able to connect with a second device, and thus are within a range of signals transmitted by the second device and are able to access the network signals provided by the second device. However, the device may connect with the computing device instead of establishing a connection directly with the second device in order to reduce the number of direct connections to the second device. Accordingly, the computing device operates as a communication proxy for the first device even when the first device is able to connect with the second device, such as a gateway or an IoT device.

At 606, the process 600 includes establishing a connection with the second device, wherein the computing device operates as a communication proxy for the first device by using the connection with the second device to exchange communications with the second device for the first device. The computing device and the first device include IoT devices and share a common cloud network service provider. The computing device and the first device may also share a common proprietary program that allows the devices to communicate, access, or control one another and to communicate with the cloud network service provider. In some embodiments, the computing device and the first device may be manufactured and/or sold by a common manufacturer that also owns or operates the common cloud network service provider and the common proprietary program. Accordingly, the computing device may operate as a communication proxy for devices that are manufactured by a common manufacturer and that share a common cloud network service provider. In some examples, the second device may communicate with connected devices using a channel of a particular frequency band, such as channel 11 of the 2.4 GHz frequency band. The computing device may establish the connection with the second device using channel 11. One of ordinary skill in the art will appreciate that any available channel of any appropriate frequency band, including those that are currently in use or that may become available at a future date, may be used to exchange communications with the second device. The computing device can then exchange communications over the established connection with the second device for itself and for the first device. For example, the computing device may transmit communications to the second device for the first device, or may receive communications from the second device that are intended for the first device and may transmit these communications to the first device. Using the computing device as a communication proxy for the first device, the number of connections with the second device is reduced by one.

At 608, the process 600 includes transmitting the device communication, wherein the device communication is transmitted using the connection with the second device. For example, the computing device may transmit the device communication to the second device over the connection so that the second device can process and route the device communication to or toward its destination.

In some embodiments, the computing device may be selected to operate as the proxy device based on various factors. For example, the computing device may be selected as the communication proxy for the device based on an ability of the computing device's receiver to receive signals from the second device that are stronger than signals that a receiver of the first device can receive. In this example, the computing device may have the strongest connection with and may receive the strongest signals from the second device compared to other devices that can connect with the gateway, including the first device, and thus may be chosen as the proxy for these other devices. As another example, the computing device may be selected as a proxy device based on particular communications capabilities. For example, the computing device may have more than one transceiver radio for a particular frequency band (e.g., 2.4 GHz, 5 GHz, or any other frequency band that is currently available or that may become available at a future date). As another example, the computing device may have higher processing power than the device that is using the computing device as a proxy. Other factors may also be considered in choosing the computing device as a proxy device, such as any of the factors or metrics described above. In some embodiments, the computing device may operate as a communication proxy for all devices located in a common geographic location that share the common cloud network service provider and/or the common proprietary program with the computing device. For example, as discussed above with respect to FIG. 5, a particular client device may operate as a proxy device for all other client devices that are located in a common geographic location.

In some embodiments, the computing device, the first device, and/or the second device may operate as nodes of a mesh network in order to route communications to different devices in the network. For example, the computing device, the first device, and/or the second device may be programmed with a dynamic routing protocol (e.g., using programs, software, or the like), similar to that described above with respect to FIGS. 2-5. An example of a routing protocol may include a Hybrid Wireless Mesh Protocol (HWMP) defined in IEEE 802.11s. One of ordinary skill in the art will appreciate that any other appropriate routing protocol may be used.

In some embodiments, the computing device includes a single transceiver radio that comprises a receiver configured to receive the device communication and a transmitter configured to transmit the device communication. For example, the connection between the computing device and the first device may be established for exchanging communications between the devices. The connection may be established using the same frequency channel as that used by the computing device to communicate with the second device over the connection with the second device, such as channel 11 of the 2.4 GHz frequency band. In this example, the computing device is only required to have a single transceiver radio for a particular frequency band (e.g., 2.4 GHz band), but may also have two or more transceiver radios for the frequency band.

In some embodiments, the computing device includes a first transceiver radio that comprises a receiver configured to receive the device communication, and a second transceiver radio that comprises a transmitter configured to transmit the device communication. For example, the connection between the computing device and the device may be established using a different frequency channel than that used for the connection between the gateway and the computing device, such as channel 6 of the 2.4 GHz frequency band. In this example, the network device 202 needs two or more transceiver radios for the particular frequency band for which the two frequency channels belong.

In some examples, as described above with respect to FIGS. 3-5, the first device may transmit a communication (e.g., one or more communication packets or frames) that is destined for a device, system, or other destination. The destination device, system, or other destination may be external to the network provided by a gateway, or may be within the network. The computing device operating as the communication proxy for the first device may receive the device communication transmitted by the first device, and may determine whether a destination for the device communication is internal or external to the network. The computing device may determine the destination for the device communication based on an identifier (e.g., a MAC address or other identifier) included in a destination address of a frame or packet of the device communication. When the device communication is to be transmitted outside of the network, the device communication must be processed by a network gateway so that the gateway can route the communication to its destination outside of the network. Accordingly, in the event the computing device determines that the destination for the device communication is external to the network, the computing device may forward or re-transmit the device communication over the connection with the gateway for further processing and routing by the gateway. The gateway may then transmit the communication to an external network (e.g., a cloud network, another wide area network, or the like) so that the communication can reach its destination.

In some embodiments when the computing device determines that the destination for the device communication is within the network provided by the gateway, the computing device may forward the device communication to an appropriate client device or gateway within the network. In some examples, one or more routing protocols, as described above, may be used by the computing device to determine an appropriate device within the network to which to send the device communication. The computing device may refer to a destination address in the received device communication, and may search a routing table to determine if the computing device is connected to the destination device to which the destination address belongs. For example, in the event that the computing device is directly connected to the destination device, the computing device may send the device communication directly to the destination device. In another example, the computing device may not be directly connected to the destination device, and may send the device communication to another device prior to the device communication reaching the destination device. The routing table stored by the computing device may indicate the best route in which to send the device communication so that the computing device determines the appropriate next device to which to send the communication. The various metrics described above (e.g., uptime, average latency, throughput, packet loss, or the like) may also be used to determine the best route and node to which to send communications, and these metrics may be stored in a routing table of the computing device. The device communication may be forwarded from one device to another device through the network until the device communication is received at the intended destination. In some embodiments, the computing device may forward the device communication to the gateway without determining whether the destination for the device communication is internal or external to the network, in which case the gateway may determine whether to send the device communication to a device within the network or to a device or system external to the network.

In some embodiments, the process 600 includes receiving a second device communication using the connection with the second device, determining that the second device communication is intended for reception by the first device, and transmitting the second device communication, wherein the second device communication is transmitted using the connection with the first device. For example, similar to the examples discussed above with respect to FIGS. 3-5, the second device may include a gateway. The gateway may receive communications from an external network (e.g., a cloud network, the Internet, or other wide area network) that are destined for one or more devices within the network provided by the gateway. The gateway may determine where the communications should be routed within the network so that they reach their destination as quickly and accurately as possible. The gateway may determine an identity of the first device based on an identifier (e.g., a MAC address or other identifier) that is included in the gateway communication, such as from a destination address or a receiver address. Using the identifier, the gateway may refer to a routing table or other reference source to determine the next device to which to send the communication so that the gateway communication can reach its destination (in this case, the first device). The gateway may determine whether it is directly or not directly connected to the first device, and may decide to transmit the gateway communication to another device on the network other than the first device in the event the gateway is not directly connected to the first device. The gateway communication may be transmitted among one or more devices on the network, including the computing device, until the gateway communication reaches the device. In other examples, the second device may include the network device 204, and the network device 204 may determine an appropriate path or router for the communication to reach the first device.

FIG. 7 illustrates another embodiment of a process 700 of operating a computing device as a communication proxy for a device. In some aspects, the process 700 may be performed by a computing device, such as a network device 202, 204, 206, 228, 402, 404, 406, 502, 504, 508, 512, 516 or an access device 208, 212, 408, 506, 518 shown in FIGS. 3-5. While specific examples may be given of a client device, such as a network device or an access device, performing the process 700, one of ordinary skill in the art will appreciate that other devices may perform the process 700.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 702, the process 700 includes receiving, on a computing device, a device communication, wherein the device communication is received using a connection with a first device, and wherein the connection with the first device is established over a first channel of a frequency band. The computing device includes a first transceiver radio configured to receive the device communication. At 704, the process 700 includes determining that the first device communication is from the first device, wherein the computing device and the first device are able to connect with a second device. The second device may include a gateway or an IoT device. The gateway or the IoT device may provide client devices with access to a network (e.g., a local area network, a personal area network, or other appropriate network). In some examples, the computing device may be an IoT device, such as one of the network devices described above, acting as a proxy for the first device. The first device may also be an IoT device, such as one of the network devices described above. The computing device may determine that the communication is received from the first device based on an identifier (e.g., a MAC address or other identifier) included in a frame or packet of the device communication. In one example, the identifier may be an identifier that is designated in the frame or packet for the device from which the device communication originates (a source address). In another example, the identifier may be an identifier that is designated in the frame or packet for the device from which the device communication was transmitted (transmitter address), which may in some cases be the same as the source address in the event the communication is transmitted by the device from which the communication originates. Using FIG. 3 as an example, the network device 202 may receive a communication from network device 204 over connection 218. The network device 202 may determine that the communication is received from the network device 204 based on an identifier (e.g., a MAC address or other identifier) included in a source address and/or a transmitter address field of a frame or packet of the device communication. As noted, the computing device and the first device are able to connect with a second device, and thus are within a range of signals transmitted by the second device and are able to access the network signals provided by the second device. However, the device may connect with the computing device instead of establishing a connection directly the second device in order to reduce the number of direct connections to the second device. Accordingly, the computing device operates as a communication proxy for the first device even when the first device is able to connect with the second device.

At 706, the process 700 includes establishing a connection with the second device, wherein the connection with the second device is established over a second channel of the frequency band, and wherein the computing device operates as a communication proxy for the first device by using the connection with the second device to exchange communications with the second device for the first device. The computing device includes a second transceiver radio configured to communicate with the second device over the second channel of the frequency band. The computing device and the first device include IoT devices and share a common cloud network service provider. The computing device and the first device may also share a common proprietary program that allows the devices to communicate, access, or control one another and to communicate with the cloud network service provider. In some embodiments, the computing device and the first device may be manufactured and/or sold by a common manufacturer that also owns or operates the common cloud network service provider and the common proprietary program. Accordingly, the computing device may operate as a communication proxy for devices that are manufactured by a common manufacturer and that share a common cloud network service provider. In some examples, the second device may communicate with connected devices using a channel of a particular frequency band, such as channel 11 of the 2.4 GHz frequency band. The computing device may establish the connection with the second device using channel 11. One of ordinary skill in the art will appreciate that any available channel of any appropriate frequency band, including those that are currently in use or that may become available at a future date, may be used to exchange communications with the second device. The computing device can then exchange communications over the established connection with the second device for itself and for the first device. For example, the computing device may transmit communications to the second device for the first device, or may receive communications from the second device that are intended for the first device and may transmit these communications to the first device. Using the computing device as a communication proxy for the first device, the number of connections with the second device is reduced by one.

At 708, the process 700 includes transmitting the device communication, wherein the device communication is transmitted over the second channel of the frequency band using the connection with the second device. The device communication is transmitted to the second device using the second transceiver radio. For example, the computing device may transmit, using the second transceiver radio, the device communication to the second device over the second channel via the connection so that the second device can process and route the device communication to or toward its destination. By having a first and a second transceiver radio, the computing device can communicate over different channels of a frequency band with the first device and the second device. Such embodiments may be advantageous, for example, when the second device requires communication using the first channel and the device requires communication using the second channel. All other embodiments described with respect to the process 600 of FIG. 6 may be performed by process 700.

Using one or more of the network configurations illustrated in FIGS. 3 and 5, and using the processes 600 and/or 700, communications may be exchanged between a gateway or other device and all devices within a local area network while direct connections are only established between the gateway and one or more of the devices that operate as proxy devices for the remaining devices. The proxy devices include less than all of the devices. By operating the devices as proxies for the other devices, the number of connections that must be maintained by the gateway is greatly reduced, leading to reduced latency and maximization of the bandwidth capability of each connection with the gateway to exchange communications, as illustrated above with respect to FIG. 5.

Figure 8:
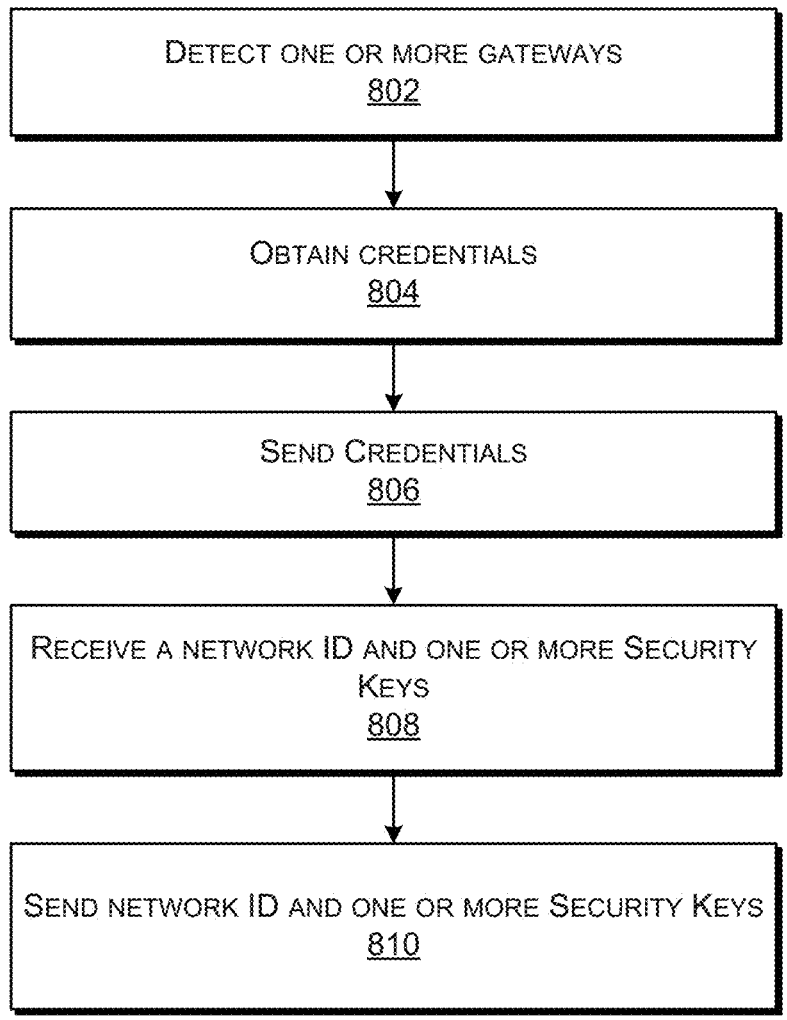
FIG. 8 is a flowchart illustrating an embodiment of a process for registering one or more network devices, in accordance with some embodiments.

As noted above in the description of FIG. 1, network devices, upon being powered on or reset, may be registered with a network (e.g., a cloud network) and associated with a logical network within a local area network. FIG. 8 illustrates an example of a process 800 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 8 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 802, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 804, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 806. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 808, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 810, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status (es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like), as described above with respect to FIG. 8. For example, as described above, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

Figure 9:
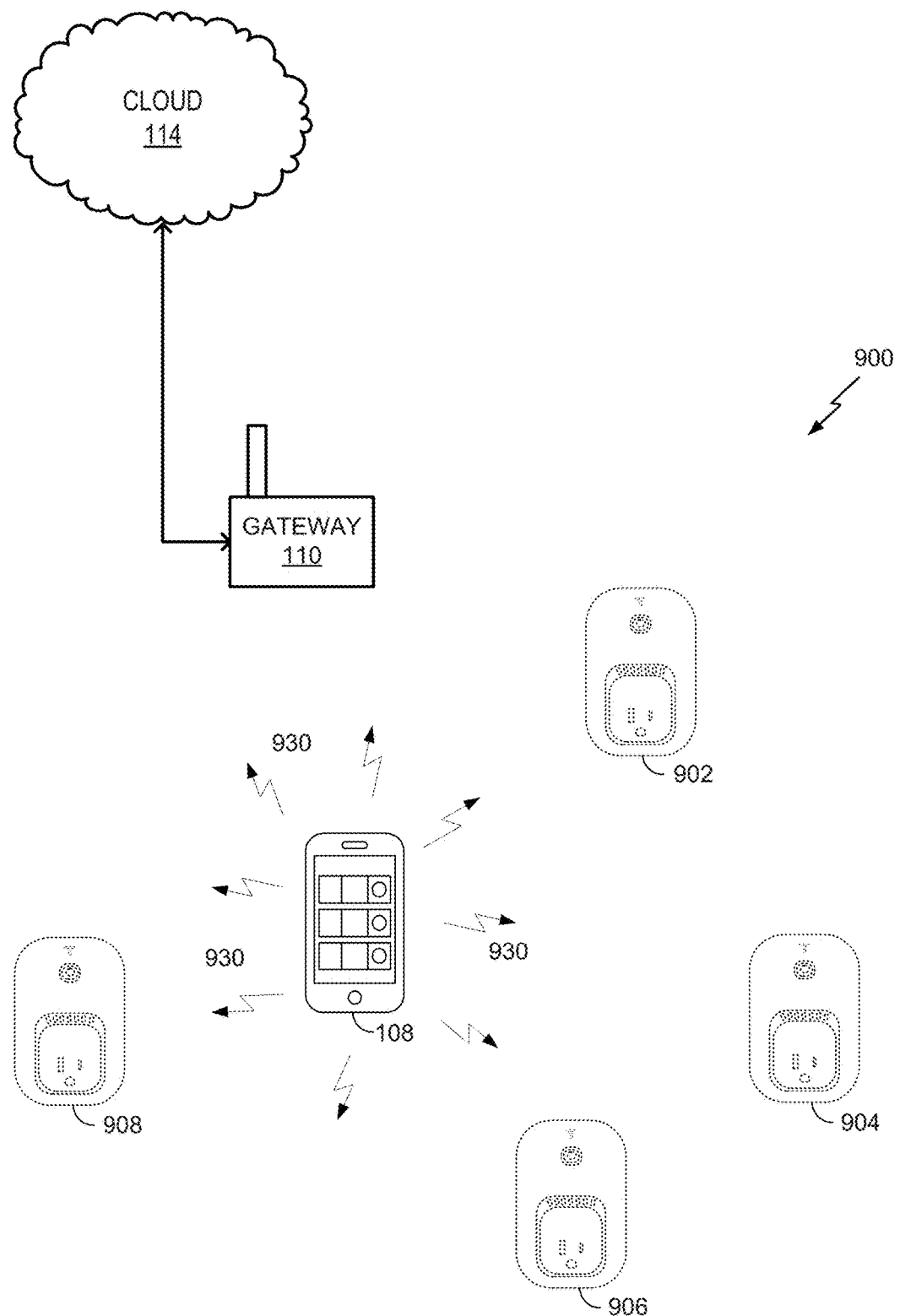
FIG. 9 is an illustration of an example of a network environment, in accordance with some embodiments.

FIG. 9 illustrates an example of a network 900, according to embodiments of the present invention. Specifically, the network 900 can be a wireless local area network enabling an access device to communicate with network devices to control adjustment of attributes related to operation of the network devices. Network 900 includes network device 902, network device 904, network device 906, and network device 908. The network 900 also includes access device 108. In other words, the network 900 may be substantially similar to the network 100 except that access device 108 has been turned on near the network 900, to which it is associated, or has entered an area to which the network 900 can reach.

When access device 108 can enter the network 900 as shown in FIG. 9, access device 108 may be authenticated based on the access device's authentication with the logical network or may otherwise commence communication with cloud network 114. Access device 108 may also communicate notification of its presence or other information directly to other network devices 902-908 within network 900, as shown in FIG. 9 by communication paths 930. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 900, including network device 902, network device 904, network device 906, and network device 908, information/data regarding its status. Such status data may include the fact that it is present and turned on, or other status data/information. At any time that network devices 902, 904, 906 and 908 recognize that access device 108 is present at network 900, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 902-908 and access device 108 may each receive communication from other network devices around the network 900, including the status of each of those network devices, network devices 902-908 and/or access device 108 may be continuously scanning network 900 (including, for example, running discovery algorithms) to determine whether any devices within the network have moved, turned on/off or otherwise added to or subtracted from the network 900, or have otherwise changed statuses.

Since network devices 902-908 and access device 108 may each receive communication from other devices around network 900, including the status of each of those devices, each network device within network 900 may know the status of each other network device in the network 900. For example, access device 108 or devices 902-908 may not be required to communicate with cloud network 114 in order to obtain one or more of such statuses. Since cloud network 114 is an external network and may be remote from network 900, communication between network devices within the network 900 and cloud 114 may take more time than communication between two devices within network 900. For example, communication between devices within network 900 may take anywhere from 1 millisecond to 100 milliseconds, while communication between a device within network 900 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 900 may choose to send and receive/retrieve statuses directly with other devices within the network 900 instead of communicating such information via cloud network 114. When a network device receives status data from another network device on the device's local area network 900, it may store that status data so that it may retrieve and use that status data at a later time.

Figure 10:
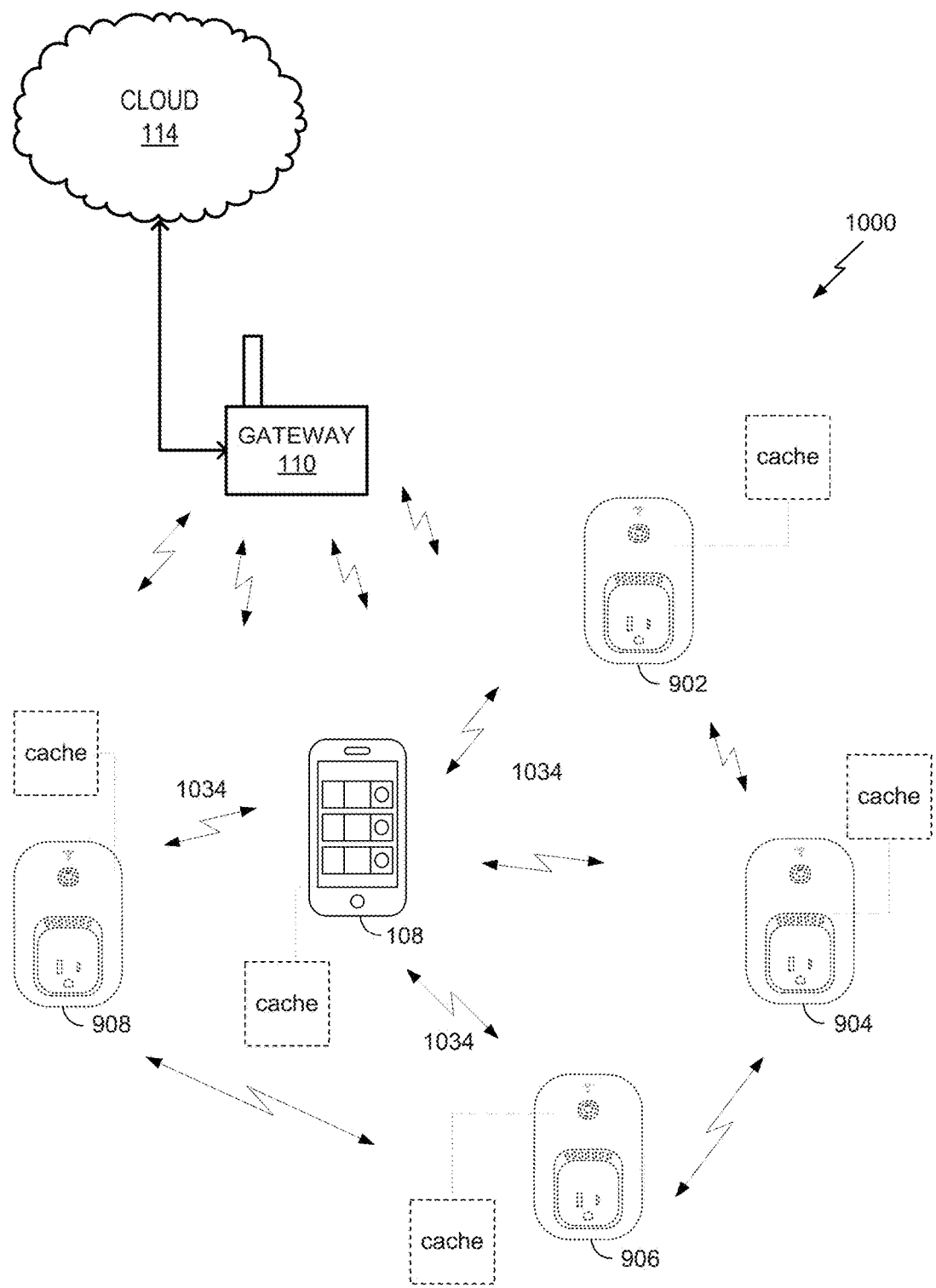
FIG. 10 is an illustration of another example of a network environment, in accordance with some embodiments.

FIG. 10 illustrates an example of a network 1000, according to embodiments of the present invention. The local area network 1000 may include network device 902, network device 904, network device 906, network device 908, and access device 108. FIG. 10 also illustrates that one or more network devices 902-908 and/or access device 108 may include a storage device, such as a cache, for storing data, including data regarding its own status and data regarding statuses received from the other devices within local area network 1000. For example, access device 108 may, after being powered up, broadcast/send its status to network device 908 via communication 1034. Network device 908 may store the status data received from access device 108 until the next time access device 108 updates its status by sending new/updated status data to network device 908. Cache may be used for storage within network devices 902-908 and/or access devices within the local area network 1000 so that each of the devices may be able to quickly retrieve the data it needs from storage. An application operating on the access device 108 can access the cache to obtain information to display the visual interface for each network device 902-908 registered within the network 1000. Although a caching device may be used to store such data within the network and/or access devices within the local area network 1000, other types of storage may be used.

The cache can contain a known interface list including interface information for different, known types of devices. The known list can include a record for each network device known by the access device 108 to exist on the network 1000. When an application is run on the access device 108, the access device 108 can access the known interfaces in the cache to present the display of access device 108. The display can present one or more visual interfaces, each corresponding to a network device known to exist on the network 1000. Each visual interface can be generated based on a visual interface module corresponding to each device on the network 1000. In an example, the display can include a visual interface (e.g., a module tile) for each device in the network 1000 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 1000. For example, the status display can include a speed of a fan (e.g., a fan speed of 56 in a range of values between 0 and 100) of the network device 902 (e.g., a fan), a value of sensitivity of a sensor (e.g., a value of 34 in a range of values 0-100) for the network device 904 (e.g., a motion sensor), a value of brightness (e.g., 65 percent brightness) for the network device 906 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 1000 and can use that information to update its own cache, update the status display, and/or pass the information to the cloud network 114 and/or the gateway 110 for trouble shooting and/or storage.

Even though each network device may know and store (e.g. in cache) the state of each other network device within local area network 1000, a network device may not know when another network device changes status (e.g. turns/powers off). However, network devices and/or access devices within local area network 1000 may broadcast/send any updates in its status to other devices on the network. For example, if network device 902 changes status, it may send status data to the other network devices, such as network devices 904, 906 and 908 and to access device 108. However, network device 902 may not know which devices to update since the other devices may change statuses periodically (e.g. turn off).

Therefore, a network or access device may subscribe to another network or access device within local area network 1000. For example, network devices 904, 906 and 908 and access device 108 may subscribe to status data notifications/updates from network device 902. Such a subscription may be registered for upon initial connection with network device 902 when network device 902 first enters local area network 1000 or at any other time after network device 902 has been associated with local area network 1000. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 8. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 902 may store a list of network devices 904, 906 and 908 and access device 108 after those devices subscribe to network device 902. Then, when network device 902 undergoes a change in status, network device 902 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 1000, each contain continuously updated statuses of each other device on the network and obtain those statuses and updates through direct communication without necessary use of the cloud.

Figure 11:
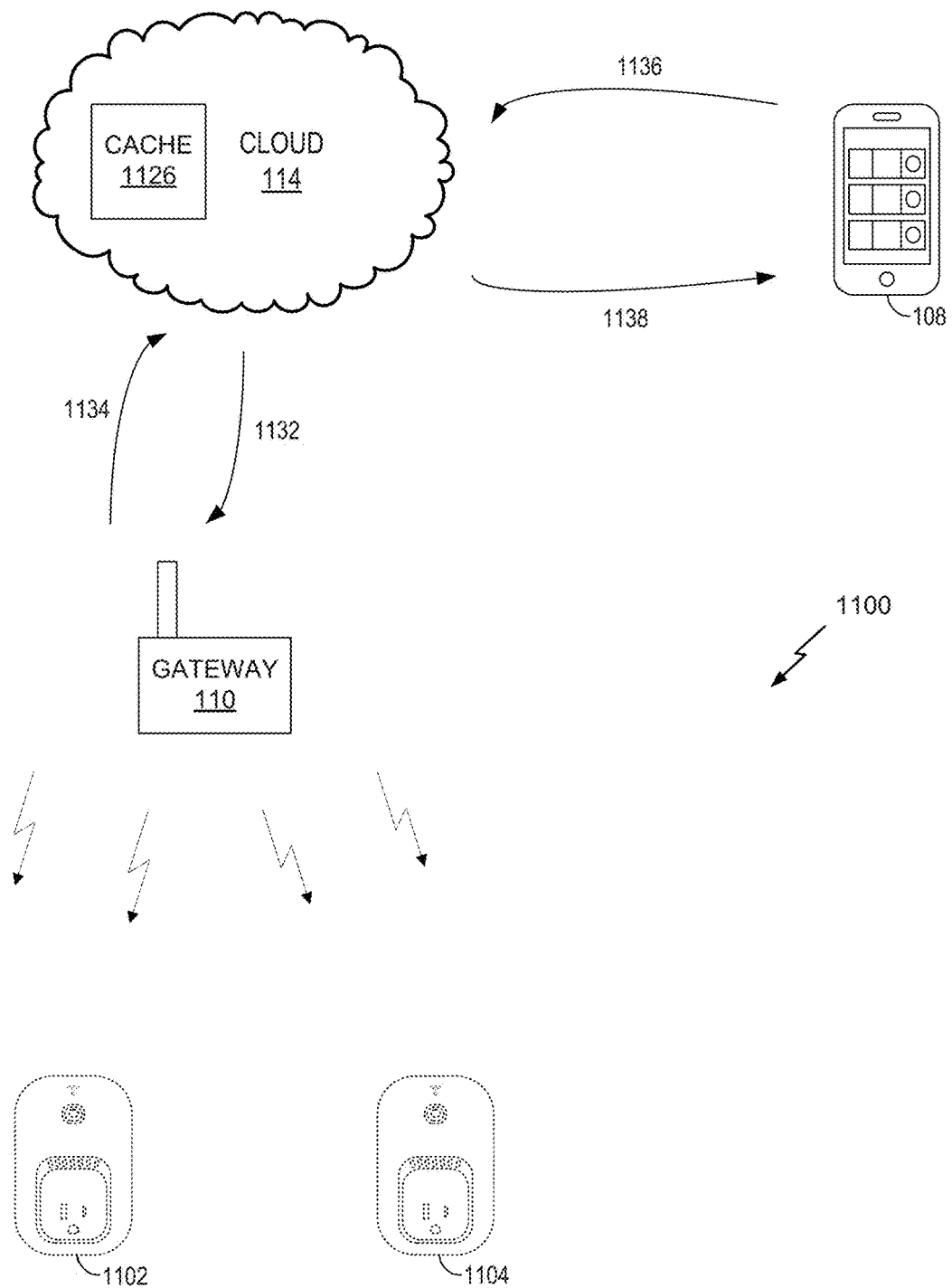
FIG. 11 is an illustration of another example of a network environment, in accordance with some embodiments.

FIG. 11 illustrates an access device 108 that is located remotely from network 1100 (e.g. local area network), according to embodiments of the present invention. Local area network 1100 includes gateway 110 and network devices 1102 and 1104 (which may be, for example, the same as any of network devices 902-908 in FIGS. 9 and 10), as shown in FIG. 11. However, network 1100 may also include a variety of other network devices and one or more access devices directly connected to network 1100. Gateway 110 is connected to cloud network 114, and allows network devices 1102 and 1104 to connect to cloud 114, the internet, or other external networks via gateway 110. In some embodiments, the network devices 1102 and 1104 may include home automation devices that allow a user to access, control, and/or configure various home appliances located within the user's home, such as a television, radio, light, microwave, iron, and/or the like.

Access device 108 is not directly connected to network 1100. Instead, access device 108 is external to network 1100 and may connect to cloud network 114 and to network 1100 via cloud network 114. As noted, network devices 1102 and 1104 may change status on a periodic basis. In some embodiments, even when external to and not directly connected to network 1100, an access device may request to check the status of the devices on the network. When access device 108 seeks to check the status of any device on the network, the access device 108 may transmit/send a communication 1136 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1138 of such status data to the access device 108. For example, after network devices 1102 and 1104 are turned on, authenticated and are a part of network 1100, network devices 1102 and 1104 may communicate their statuses to cloud network 114. Furthermore, any time the status of network devices 1102 and 1104 changes, the device that incurred a status change may push/send information (e.g. an indication) of that status change to cloud network 114. Cloud network 114 may store, in cache 1126 or otherwise, the statuses (which may be time stamped in metadata or otherwise) of network devices 1102 and 1104. Therefore, when access device 108 requests from cloud network 114 the statuses of devices on network 1100, cloud 114 may send its most recently stored/updated statuses to access device 108.

To obtain the most updated status data of devices within network 1100, cloud 114 may, upon receiving a request for status data related to network devices 1102 and 1104, transmit/send a communication 1132 (e.g. request, query, etc.) for such status data to network devices 1102 and 1104 via gateway 110. Once network devices 1102 and 1104 receive this request, network devices 1102 and 1104 may send a communication 1134 (e.g. updated status data) to cloud 114 to replace the previously stored/cached statuses in cache 1126. Upon receipt of updated status data 1134 from network 1100, cloud 114 may send a communication 1138 of such status data to the access device 108.

However, the process of cloud network 114 requesting updated statuses from network devices 1102 and 1104 within network 1100 may cause latency within the system. More specifically, the time required for cloud network 114 to request updated statuses from network devices 1102 and 1104 and to in turn receive updated statuses from network devices 1102 and 1104 may be substantially greater than the time required for cloud network 114 to send its currently stored statuses (without being updated) for network devices 1102 and 1104 to access device 108. For example, of the total time required for access device 108 to receive updated statuses from cloud network 114, 80% or more of that total time may include cloud network 114 requesting updated statuses from network devices 1102 and 1104. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 1102 and 1104 is the transmission of data between cloud 114 and network devices 1102 and 1104, the access device 108 and cloud network 114 may maximize efficiency by minimizing the effect of the transmission of data between cloud 114 and network devices 1102 and 1104 on the whole process/system.

Figure 12:
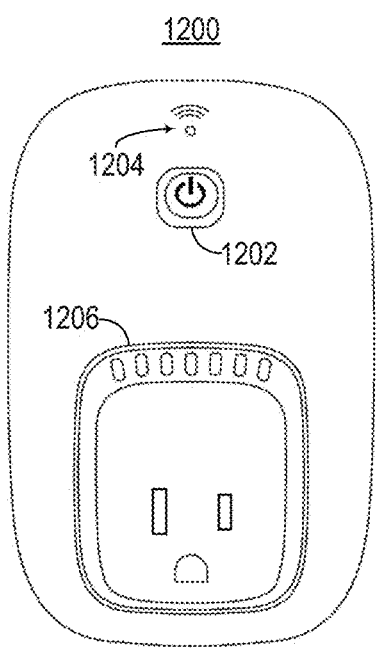
FIG. 12 is an illustration of an example of a front view of a network device, in accordance with an embodiment.
Figure 13:
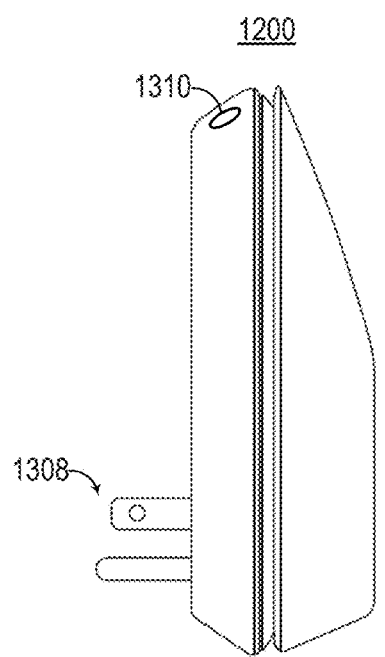
FIG. 13 is an illustration of an example of a side view of a network device, in accordance with an embodiment.

FIG. 12 illustrates an example of a front view of a network device 1200. FIG. 13 illustrates an example of a side view of the network device 1200. The network device 1200 may include any of the network devices 102, 104, or 106 described herein. In some embodiments, the network device 1200 may be a home automation network device. For example, the network device 1200 may include a home automation switch that may be coupled with a home appliance. A user may wirelessly access the network device 1200 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1200 may include a WiFi enabled switch that connects home appliances and other electronic devices to a compatible 802.11b/g/n/ac WiFi network. The network device 1200 may thus allow users to locally or remotely turn devices on or off from anywhere, program customized notifications, and/or change device status. The network device 1200 may further allow a user to create custom schedules or have devices respond to sunrise or sunset.

The network device 1200 includes an power switch 1202 that may be depressed in order to turn the network device 1200 on and off. In some embodiments, a light source may be integrated with or located behind the power switch. For example, a light-emitting diode (LED) may be located on a circuit board under the power button 1202. The light source may be illuminated when the network device 1200 is powered on, and may not be illuminated when the network device 1200 is powered off.

The network device 1200 further includes a communications signal indicator 1204. The signal indicator 1204 may indicate whether the network device 1200 has access to a communications signal, such as a WiFi signal. For example, the signal indicator 1204 may include a light source (e.g., a LED) that illuminates when the network device 1200 is connected to a communications signal. The light source may depict different colors or other characteristics (e.g., flashing, dimming, or the like) to indicate different levels of signal strength or mode of operation.

The network device 1200 includes a restore button 1310. The restore button 1310 may allow a user to reset the network device 1200 to factory default settings. For example, upon being depressed, the restore button 1310 may cause all software on the device to be reset to the settings that the network device 1200 included when purchased from the manufacturer.

The network device 1200 further includes a plug 1308 and an outlet 1206. The plug 1308 allows the network device 1200 to be plugged into a wall socket, such as a socket providing 120V, 220V, or the like. In turn, an appliance may be plugged into the outlet 1206. Once the network device 1200 is registered according to the techniques described above, an appliance plugged into the socket 1206 may be controlled by a user using an access device (e.g., access device 108).

Figure 14:
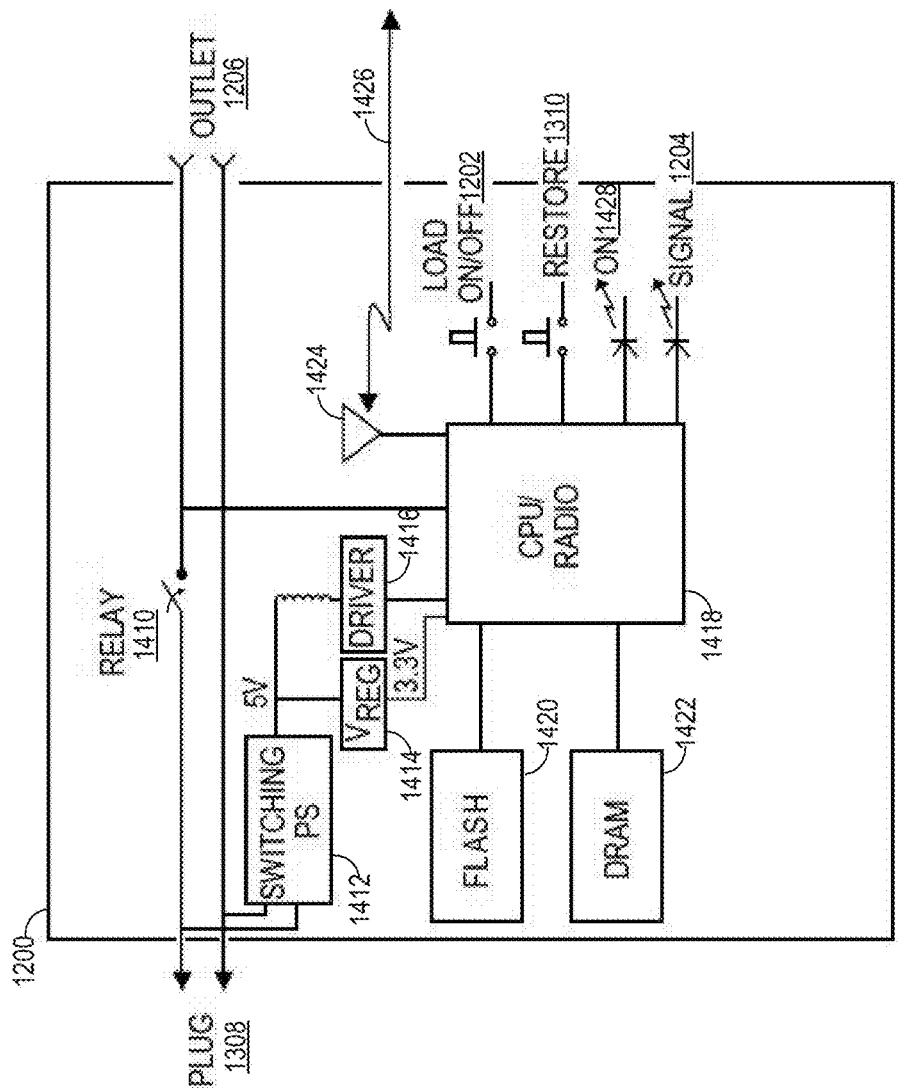
FIG. 14 is an example of a block diagram of a network device, in accordance with an embodiment.

FIG. 14 is an example of a block diagram of the network device 1200 depicting different hardware and/or software components of the network device 1200. As described above with respect to FIGS. 12 and 13, the network device 1200 includes the outlet 1206, the plug 1308, the power button 1202, the restore button 1310, and the communications signal indicator 1204. The network device 1200 also includes light source 1428 associated with the power button 1202. As previously described, the light source 1428 may be illuminated when the network device 1200 is powered on.

The network device 1200 further includes a relay 1410. The relay 1410 is a switch that controls whether power is relayed from the plug 1308 to the outlet 1206. The relay 1410 may be controlled either manually using the power button 1202 or remotely using wireless communication signals. For example, when the power button 1202 is in an ON position, the relay 1410 may be closed so that power is relayed from the plug 1308 to the outlet 1206. When the power button 1202 is in an OFF position, the relay 1410 may be opened so that current is unable to flow from the plug 1308 to the outlet 1206. As another example, an application or program running on an access device may transmit a signal that causes the relay 1410 to be opened or closed. For instance, an access application may display a graphical interface on the access device that includes a power button. The user may tap or otherwise select the power button, and the access application may send a communication signal (e.g., over a WiFi network) to the network device 1200 instructing the network device 1200 to open or close the relay 1410.

The network device 1200 further includes flash memory 1420 and dynamic random access memory (DRAM) 1422. The flash memory 1420 may be used to store instructions or code relating to an operating system, one or more applications, and any firmware. The flash memory 1420 may include nonvolatile memory so that any firmware or other program can be can updated. In the event the network device 1200 loses power, information stored in the flash memory 1420 may be retained. The DRAM 1422 may store various other types of information needed to run the network device 1200, such as all runtime instructions or code.

The network device 1200 further includes a CPU/Radio 1418. The CPU/Radio 1418 controls the operations of the network device 1200. For example, the CPU/Radio 1418 may execute various applications or programs stored in the flash memory 1420 and/or the dynamic random access memory (DRAM) 1422. The CPU/Radio 1418 may also receive input from the various hardware and software components, interpret the input, and perform one or more functions in response to the input. As one example, the CPU/Radio 1418 may determine whether the power button 1202 has been pressed, and determines whether the relay 1410 needs to be opened or closed. The CPU/Radio 1418 may further perform all communications functions in order to allow the network device 1200 to communicate with other network devices, one or more gateways, a cloud network, and/or one or more access devices. While the CPU and radio of the network device 1200 are shown to be combined in the CPU/Radio 1418, one of ordinary skill in the art will appreciate that, in some embodiments, the CPU and radio may be separately located within the network device 1200. For example, CPU circuitry may be situated at a separate location on a circuit board from the location of radio circuitry, the CPU circuitry may be located on a different circuit board from the radio circuitry, or the like. Further, the network device 1200 may include multiple transceiver radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. For example, the network device 1200 may include a single transceiver radio for each frequency band of one or more of the communication protocols (e.g., a single 5 GHz transceiver radio and a single 2.4 GHz transceiver radio, or the like). As another example, the network device 1200 may include two or more transceiver radios for each frequency band of one or more of the communication protocols (e.g., two 5 GHz transceiver radios and a two 2.4 GHz transceiver radios, or the like). In examples in which the network device 1200 includes multiple transceiver radios for a frequency band of a communication protocol, the network device 1200 may communicate using multiple channels (up to the number of transceiver radios) of the frequency band at any given point in time. In some embodiments, the network device 1200 does not include a cellular network transceiver radio or interface, and thus may not be configured to directly communicate with a cellular network. In some embodiments, the network device 1200 may include a cellular network transceiver radio, and may be configured to communicate with a cellular network using the cellular network transceiver radio.

The network device 1200 may communicate with other devices and/or networks via antenna 1424. For example, antenna 1424 may include a 2.4 GHz antenna, a 5 GHz antenna, or the like, that can transmit and receive WiFi communications signals. The network device 1200 may include other types of antennas that can communicate Bluetooth® signals, Zigbee® signals, Ultra-Wideband (UWB) signals, WiFi-Direct signals, BLE signals, and/or the like. In some embodiments, the antenna 1424 may be configured to communicate different types of signals, such as the WiFi signals, Bluetooth® signals, Zigbee® signals, UWB signals, WiFi-Direct signals, BLE signals, and/or the like. In some embodiments, the network device 1200 may include multiple antennas for communicating the different types of communication signals. As one example, the network device 1200 may include both a 2.4 GHz antenna and a 5 GHz antenna.

The network device 1200 further includes a driver 1416, a switching power supply 1412, and a voltage regulator 1414. The driver 1416 may include instructions or code that can be used to translate control signals or commands received from applications running on the DRAM 1422 to commands that the various hardware components in the network device 1200 can understand. In some embodiments, the driver 1416 may include an ambient application running on the DRAM 1422. The switching power supply 1412 may be used to transfer power from the outlet in which the plug 1308 is connected to the various loads of the network device 1200 (e.g., CPU/Radio 1418). The switching power supply 1412 may efficiently convert the voltage and current characteristics of the electrical power to a level that is appropriate for the components of the network device 1200. For example, the switching power supply 1412 may perform AC-DC conversion. In some embodiments, the switching power supply 1412 may be used to control the power that is relayed from the plug 1308 to the outlet 1206. The voltage regulator 1414 may be used to convert the voltage output from the switching power supply 1412 to a lower voltage usable by the CPU/Radio 1418. For example, the voltage regulator 1414 may regulate the DC voltage from 5V to 3.3V.

In various embodiments, functions may be stored as one or more computer-program products, such as instructions or code, in a non-transitory machine-readable storage medium, such as the flash memory 1420 and/or the DRAM 1422. The network device 1200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 6-8, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 6-8. The memory, such as the flash memory 1420 and/or the DRAM 1422, may be a processor-readable memory and/or a computer-readable memory that stores software code (programming code, instructions, etc.) configured to cause a processor(s) within the CPU/Radio 1418 to perform the functions described. In other embodiments, one or more of the functions described may be performed in hardware.

A set of these instructions and/or code might be stored on a non-transitory machine-readable storage medium, such as the flash memory 1420 and/or the DRAM 1422. In some cases, the storage medium might be incorporated within a computer system, such as the CPU/Radio 1418. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1200 and/or might take the form of source and/or installable code, which, upon compilation and/or installation on the network device 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1200 may have other components than those depicted in FIGS. 12-14. Further, the embodiment shown in the figures are only one example of a network device that may incorporate an embodiment of the invention. In some other embodiments, network device 1200 may have more or fewer components than shown in the figure, may combine two or more components, or may have a different configuration or arrangement of components.

Figure 15:
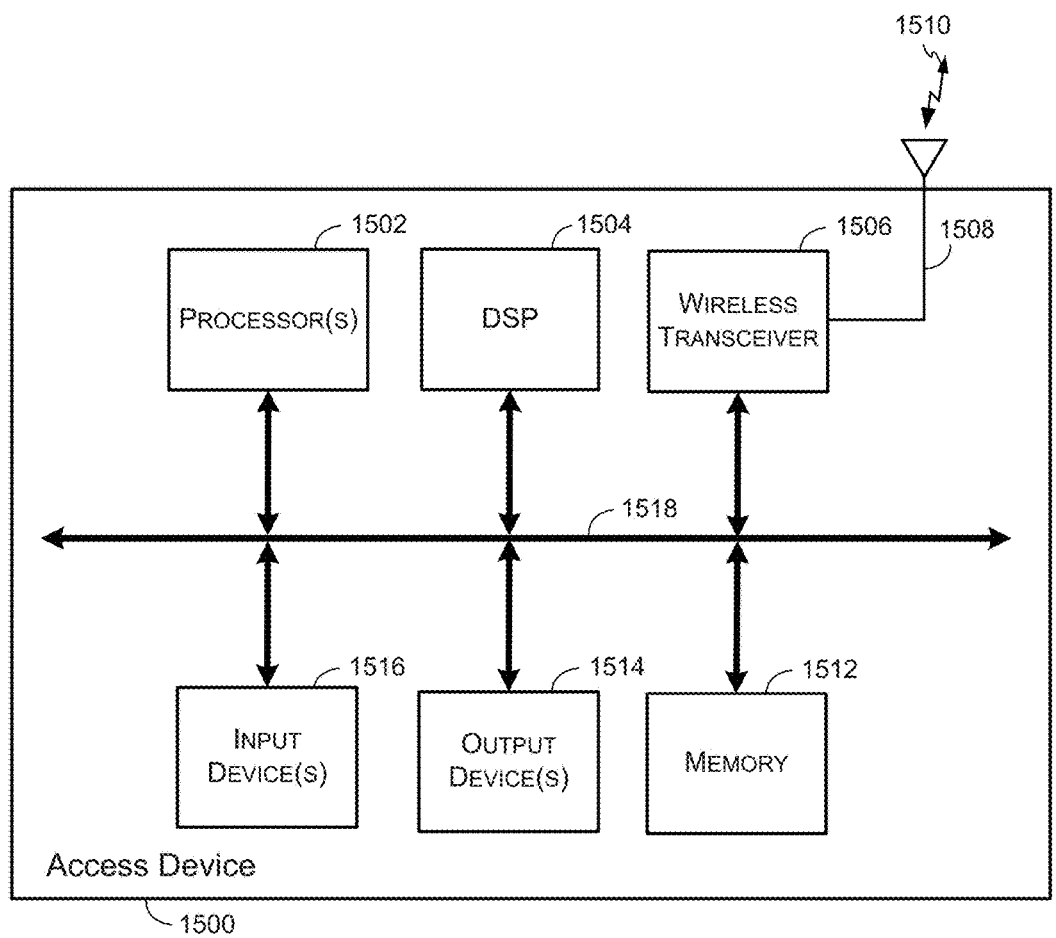
FIG. 15 is a block diagram illustrating an example of an access device, in accordance with some embodiments.

FIG. 15 illustrates an example of an access device 1500. The access device 1500 may include any human-to-machine interface with network connection capability that allows access to a network. For example, the access device 1500 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1500 includes hardware elements that can be electrically coupled via a bus 1518 (or may otherwise be in communication, as appropriate). In one embodiment, the bus 1518 can be used for the processor(s) 1502 to communicate between cores and/or with the memory 1512. The hardware elements may include one or more processors 1502, including without limitation one or more general-purpose processors and/or one or more special-purpose processors (such as digital signal processing chips, graphics acceleration processors, and/or the like); one or more input devices 1516, which can include without limitation a camera, a mouse, a keyboard, a touch sensitive screen, a touch pad, a keypad, and/or the like; and one or more output devices 1514, which can include, without limitation, a display, a printer, and/or the like.

The access device 1500 may include one or more wireless transceivers 1506 connected to the bus 1518. The wireless transceiver 1506 may be operable to receive wireless signals via antenna 1508 (e.g., signal 1510). The wireless signal 1510 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1506 may be configured to receive various radio frequency (RF) signals (e.g., signal 1510) via antenna 1508 from one or more gateways, network devices, other access devices, cloud networks, and/or the like. Access device 1500 may also be configured to decode and/or decrypt, via the DSP 1504 and/or processor(s) 1502, various signals received from one or more gateways, network devices, other access devices, cloud networks, and/or the like.

The access device 1500 may further include (and/or be in communication with) one or more non-transitory machine-readable storage mediums or storage devices (e.g., memory 1512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1512, such as RAM, ROM, FLASH, or disc drive, and executed by processor(s) 1502 or DSP 1504. The access device 1500 can also comprise software elements (e.g., located within the memory 1512), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 6-7, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 6-7. The memory 1512 may be a non-transitory machine-readable storage medium, processor-readable memory, and/or a computer-readable memory that stores the one or more computer-program products configured to cause the processor(s) 1502 to perform the functions described. In other embodiments, one or more of the functions described may be performed in hardware.

A set of these instructions and/or code might be stored on a non-transitory machine-readable storage medium, such as the memory 1512. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the access device 1500 and/or might take the form of source and/or installable code, which, upon compilation and/or installation on the access device 1500 (e.g., using any of a variety of generally available compilers, installation programs, compression/decompression utilities, etc.) then takes the form of executable code.

Figure 16:
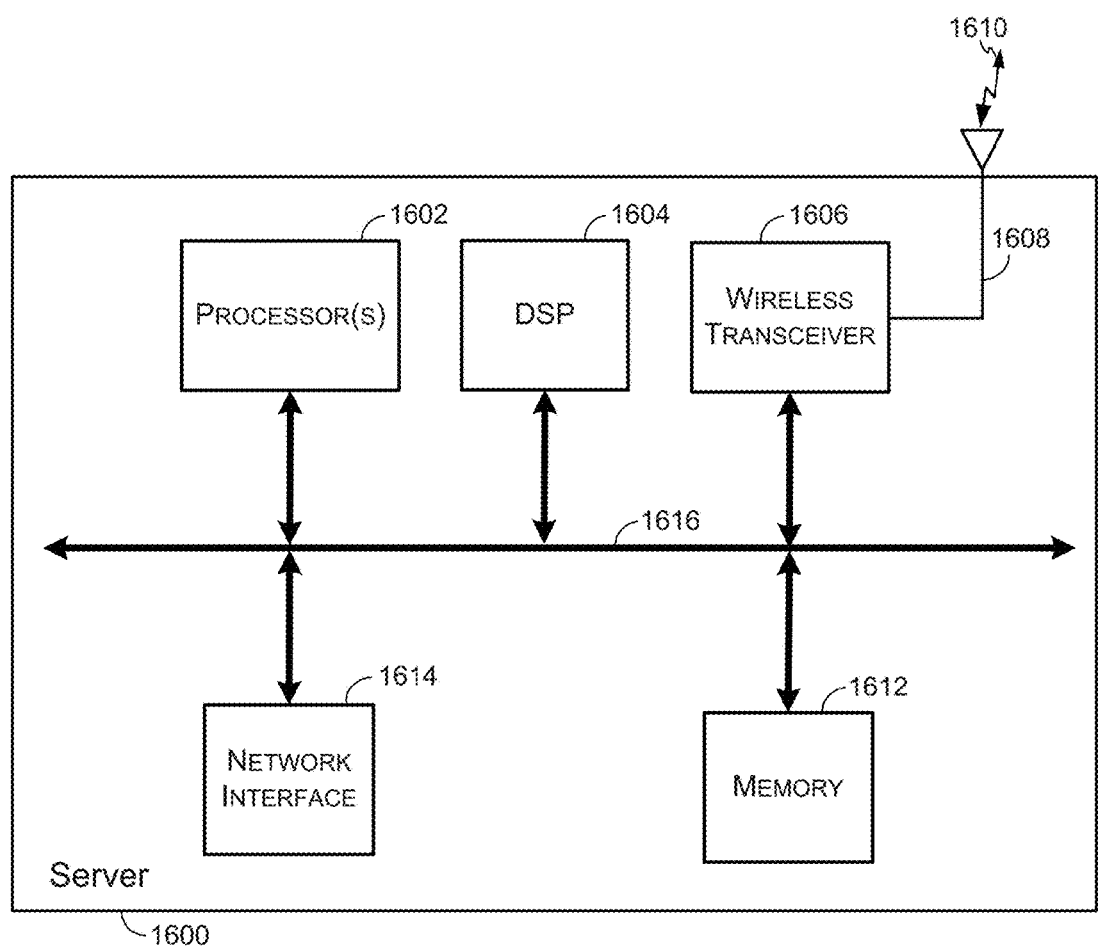
FIG. 16 is a block diagram illustrating an example of a server, in accordance with some embodiments.

FIG. 16 illustrates an example of a server 1600. The server 1600 includes hardware elements that can be electrically coupled via a bus 1616 (or may otherwise be in communication, as appropriate). In one embodiment, the bus 1616 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like), memory 1612, DSP 1604, a wireless transceiver 1606, a bus 1616, and antenna 1608. Furthermore, in addition to the wireless transceiver 1606, server 1600 can further include a network interface 1614 to communicate with a network (e.g., a local area network, a network of a preferred carrier, Internet, etc.).

The server 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1612. The server 1600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems. The memory 1612 may be a non-transitory machine-readable storage medium, processor-readable memory, and/or a computer-readable memory that stores the one or more computer-program products configured to cause the processor(s) 1602 to perform the various functions. In other embodiments, one or more functions may be performed in hardware.

Figure 17:
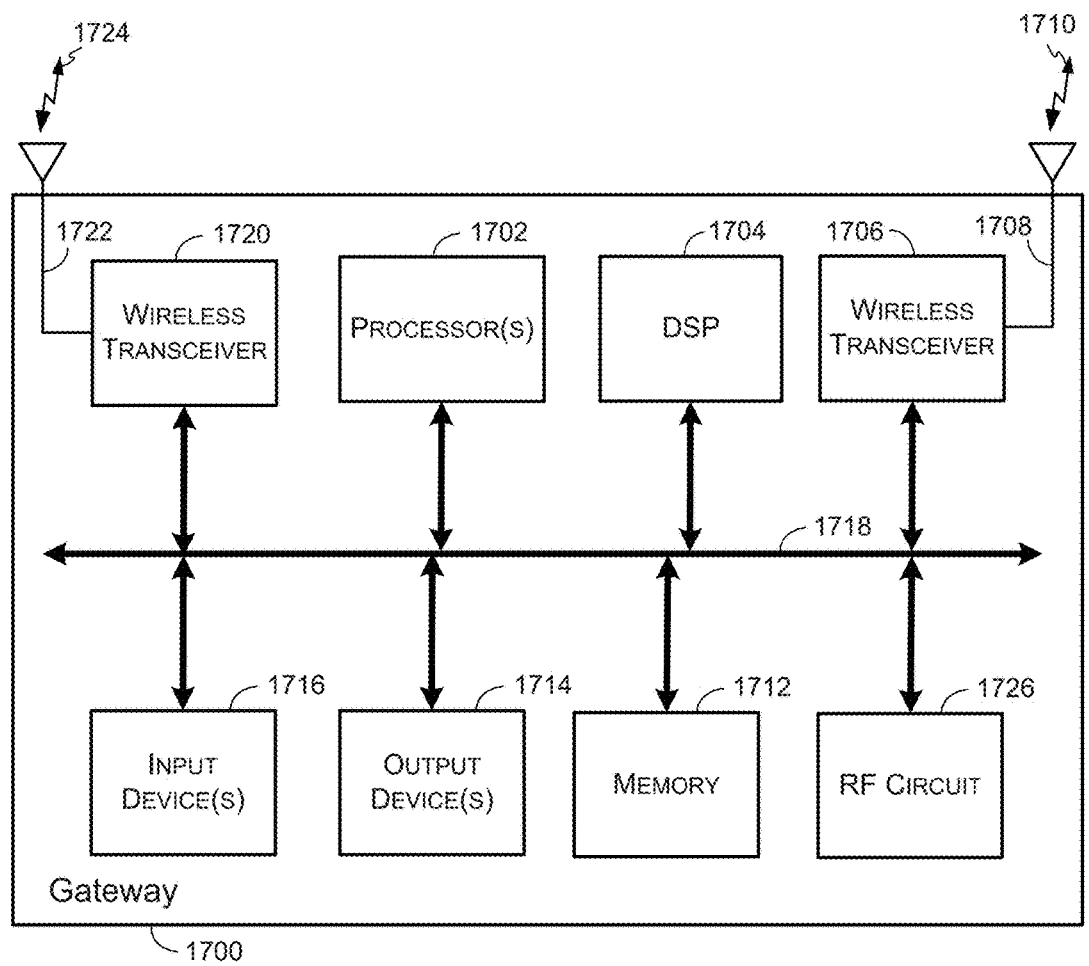
FIG. 17 is a block diagram illustrating an example of a gateway, in accordance with some embodiments.

FIG. 17 illustrates an example of a gateway 1700. The gateway 1700 may include a range extending device, a router, an access point, a modem, and/or any other device that provides network access among one or more computing devices and/or external networks. For example, the gateway 1700 may include a router gateway with access point and router functionality, and may further include an Ethernet switch and/or a modem. As another example, the gateway 1700 may include a range extending gateway that may be used to improve signal range and strength within a network by taking an existing signal from another gateway (e.g., a router gateway, an access point, or the like) and rebroadcasting the signal to create a second logical network.

The gateway 1700 includes hardware elements that can be electrically coupled via a bus 1718 (or may otherwise be in communication, as appropriate). In one embodiment, the bus 1718 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like); one or more input devices 1716, which can include without limitation one or more buttons, a keyboard, a keypad, a touch sensitive screen, a touch pad, and/or the like; and one or more output devices 1714, which can include, without limitation, a display, light or sound indicators, and/or the like.

The gateway 1700 may include one or more wireless transceivers 1706 and 1720 connected to the bus 1718. The wireless transceiver 1706 may be operable to receive wireless signals (e.g., a wireless signal 1710) via an antenna 1708. The wireless transceivers 1720 may be operable to receive wireless signals (e.g., a wireless signal 1714) via an antenna 1722. The wireless transceivers 1706 and 1720 may each include a WiFi transceiver radio designed to transmit and receive signals using frequencies of a specific frequency band, which may be referred to herein as "WiFi circuits." For example, wireless transceiver 1706 may include a 2.4 GHz WiFi circuit, and wireless transceiver 1720 may include a 5 GHz WiFi circuit. Accordingly, the gateway 1700 may include a single WiFi circuit for a first WiFi frequency band, and a single WiFi circuit for a second WiFi frequency band. In some embodiments, the gateway 1700 may include multiple wireless transceivers (not shown) for each available frequency band. The antennas 1708 and 1722 may include multiple band antennas that can transmit and/or receive signals over different frequency bands.

The gateway 1700 may further include radio frequency (RF) circuit 1726. In some embodiments, the wireless transceivers 1706 and 1720 may be integrated with or coupled to the RF circuit 1726 so that the RF circuit 1726 includes the wireless transceivers 1706 and 1720. In some embodiments, the wireless transceivers 1706 and 1720 and the RF circuit 1726 are separate components. The RF circuit 1726 may include a RF amplifier that may amplify signals received over antennas 1708 and 1722. The RF circuit 1726 may also include a power controller that may be used to adjust signal amplification by the RF amplifier. The power controller may be implemented using hardware, firmware, software, or any combination thereof.

The wireless signals 1710 and 1724 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 1706 and 1720 may be configured to receive various radio frequency (RF) signals (e.g., signals 1710 and 1724) via antennas 1708 and 1724, respectively, from one or more other gateways, access devices, network devices, cloud networks, and/or the like. Gateway 1700 may also be configured to decode and/or decrypt, via the DSP 1704 and/or processor(s) 1702, various signals received from one or more gateways, network devices, cloud networks, and/or the like.

The gateway 1700 may include a power supply (not shown) that can power the various components of the gateway 1700. The power supply may include a switch-mode power supply, a linear power supply, a push-pull power supply, or any other suitable type of power supply. In some embodiments, the gateway 1700 may include multiple power supplies. For example, a switch-mode power supply may be used to condition input power, and a linear power supply may be used to power the RF circuit 1726. The power supply may be configured to operate over various ranges of appropriate input voltages.

The gateway 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1712, such as RAM, ROM, FLASH, or disc drive, and executed by processor(s) 1702 or DSP 1704. The gateway 1700 can also comprise software elements (e.g., located within the memory 1712), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 6-8, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform operations described above with respect to FIG. 6-8. The memory 1712 may be a non-transitory machine-readable storage medium, processor-readable memory, and/or a computer-readable memory that stores the one or more computer-program products configured to cause the processor(s) 1702 to perform the functions described. In other embodiments, one or more of the functions described may be performed in hardware.

A set of these instructions and/or code might be stored on a non-transitory machine-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1700 and/or might take the form of source and/or installable code, which, upon compilation and/or installation on the gateway 1700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computing device, comprising:
   one or more processors;
   a receiver configured to receive a device communication, wherein the device communication is received using a connection with a first device, wherein the computing device and the first device share a common cloud network service provider, and wherein the computing device and the first device are nodes in a mesh network;
   a non-transitory machine-readable storage medium containing instructions, which when executed on the one or more processors, cause the one or more processors to perform operations including:
   identifying one or more other devices sharing the common cloud network service provider, wherein the one or more other devices are nodes in the mesh network, wherein the computing device, the first device, and the one or more other devices are configured to operate as communication proxies in the mesh network, and wherein nodes of the mesh network are configured to communicate directly with one or more other nodes of the mesh network;
   determining a current utilization of an outbound channel of the computing device, wherein the current utilization indicates an amount of bandwidth of the outbound channel that is currently being consumed by the computing device; and
   determining a maximum utilization of an outbound channel of the computing device and the one or more other devices, wherein the maximum utilization is determined by adding the current utilization of the outbound channel to an amount of bandwidth required to transmit a device communication;
   comparing the maximum utilization of the computing device to the maximum utilization of the one or more other devices;
   determining that the computing device is selected to be a proxy device when the computing device uses a higher maximum utilization as compared to the maximum utilization of the one or more other devices, wherein the proxy device facilitates communication between the first device and a second device;
   establishing a connection, wherein the computing device operates as a communication proxy for the first device; and
   a transmitter configured to transmit the device communication, wherein the device communication is transmitted using the connection between the computing device and the second device.

2. The computing device of claim 1, wherein the computing device operates as a communication proxy for a device when the device is able to connect with the second device.

3. The computing device of claim 1, wherein the second device includes a gateway.

4. The computing device of claim 1, wherein the second device includes an Internet of Things device.

5. The computing device of claim 1, wherein a single transceiver radio includes the receiver and the transmitter.

6. The computing device of claim 1, wherein a first transceiver radio includes the receiver, and wherein a second transceiver radio includes the transmitter.

7. The computing device of claim 1, wherein the computing device operates as a communication proxy for all devices located in a common geographic location.

8. The computing device of claim 1, further comprising:
   wherein the receiver is configured to receive a second device communication using the connection with the second device;
   instructions, which when executed on the one or more processors, cause the one or more processors to determine that the second device communication is intended for reception by the first device; and
   wherein the transmitter is configured to transmit the second device communication, wherein the second device communication is transmitted using the connection with the first device.

9. The computing device of claim 1, wherein the computing device is selected to be a proxy device based further on one or more factors including an ability of the receiver to receive signals from the second device that are stronger than signals that a receiver of the first device can receive.

10. The computing device of claim 1, wherein when it is determined that the device communication is from the first device, the first device and the computing device are able to connect to the second device.

11. The computing device of claim 1, wherein the computing device is selected to be the proxy device for the first device from among the computing device and the one or more other devices.

12. A computer-implemented method, comprising:
receiving, on a computing device, a device communication, wherein the device communication is received using a connection with a first device, and wherein the computing device and the first device share a common cloud network service provider, and wherein the computing device and the first device are nodes in a mesh network;
identifying one or more other devices sharing the common cloud network service provider, wherein the one or more other devices are nodes in the mesh network, wherein the computing device, the first device, and the one or more other devices are configured to operate as communication proxies in the mesh network, and wherein nodes of the mesh network are configured to communicate directly with one or more other nodes of the mesh network;
determining a current utilization of an outbound channel of the computing device, wherein the current utilization indicates an amount of bandwidth of the outbound channel that is currently being consumed by the computing device; and
determining a maximum utilization of an outbound channel of the computing device and the one or more other devices, wherein the maximum utilization is determined by adding the current utilization of the outbound channel to an amount of bandwidth required to transmit a device communication;
comparing the maximum utilization of the computing device to the maximum utilization of the one or more other devices;
determining that the computing device is selected to be a proxy device when the computing device uses a higher maximum utilization as compared to the maximum utilization of the one or more other devices, wherein the proxy device facilitates communication between the first device and a second device;
establishing a connection, wherein the computing device operates as a communication proxy for the first device; and
transmitting the device communication, wherein the device communication is transmitted using the connection between the computing device and the second device.

13. The method of claim 2, wherein the computing device operates as a communication proxy for a device when the device is able to connect with the second device.

14. The method of claim 12, wherein the second device includes a gateway.

15. The method of claim 12, wherein the second device includes an Internet of Things device.

16. The method of claim 12, wherein the computing device includes a single transceiver radio comprising a receiver configured to receive the device communication and a transmitter configured to transmit the device communication.

17. The method of claim 16, wherein the computing device is selected to be a proxy device based further on one or more factors including an ability of the receiver to receive signals from the second device that are stronger than signals that a receiver of the first device can receive.

18. The method of claim 12, wherein the computing device includes:
a first transceiver radio comprising a receiver configured to receive the device communication; and a second transceiver radio comprising a transmitter configured to transmit the device communication.

19. The method of claim 12, wherein the computing device operates as a communication proxy for all devices located in a common geographic location.

20. The method of claim 12, further comprising:
receiving a second device communication using the connection with the second device;
determining that the second device communication is intended for reception by the first device; and
transmitting the second device communication, wherein the second device communication is transmitted using the connection with the first device.

21. The method of claim 12, wherein when it is determined that the device communication is from the first device, the first device and the computing device are able to connect to the second device.

22. The method of claim 12, wherein the computing device is selected to be the proxy device for the first device from among the computing device and the one or more other devices.

23. A computer-program product tangibly embodied in a non-transitory machine-readable storage medium of a computing device, including instructions configured to cause one or more data processors to:
receive a device communication, wherein the device communication is received using a connection with a first device, wherein the computing device and the first device share a common cloud network service provider, and wherein the computing device and the first device are nodes in a mesh network;
identify one or more other devices sharing the common cloud network service provider, wherein the one or more other devices are nodes in the mesh network, wherein the computing device, the first device, and the one or more other devices are configured to operate as communication proxies in the mesh network, and wherein nodes of the mesh network are configured to communicate directly with one or more other nodes of the mesh network;
determining a current utilization of an outbound channel of the computing device, wherein the current utilization indicates an amount of bandwidth of the outbound channel that is currently being consumed by the computing device; and
determining a maximum utilization of an outbound channel of the computing device and the one or more other devices, wherein the maximum utilization is determined by adding the current utilization of the outbound channel to an amount of bandwidth required to transmit a device communication;
comparing the maximum utilization of the computing device to the maximum utilization of the one or more other devices;
determining that the computing device is selected to be a proxy device when the computing device uses a higher maximum utilization as compared to the maximum utilization of the one or more other devices, wherein the proxy device facilitates communication between the first device and a second device;

establish a connection, wherein the computing device operates as a communication proxy for the first device; and transmit the device communication, wherein the device communication is transmitted using the connection between the computing device and the second device.

24. The computer-program product of claim 23, wherein the computing device operates as a communication proxy for a device when the device is able to connect with the second device.

* * * * *